(12) United States Patent
Vivekraja et al.

(10) Patent No.: US 12,518,167 B1
(45) Date of Patent: Jan. 6, 2026

(54) NEURAL NETWORK TRAINING IN A DISTRIBUTED SYSTEM

(71) Applicant: Amazon Technologies, Inc., Seattle, WA (US)

(72) Inventors: Vignesh Vivekraja, Santa Clara, CA (US); Thiam Khean Hah, Milpitas, CA (US); Randy Renfu Huang, Morgan Hill, CA (US); Richard John Heaton, San Jose, CA (US); Ron Diamant, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 836 days.

(21) Appl. No.: 16/588,645

(22) Filed: Sep. 30, 2019

(51) Int. Cl.
*G06N 3/084* (2023.01)
*G06N 3/04* (2023.01)
*G06N 3/063* (2023.01)

(52) U.S. Cl.
CPC ............... *G06N 3/084* (2013.01); *G06N 3/04* (2013.01); *G06N 3/063* (2013.01)

(58) Field of Classification Search
CPC .......... G06N 3/084; G06N 3/04; G06N 3/063
See application file for complete search history.

(56) References Cited

U.S. PATENT DOCUMENTS

| | | | | |
|---|---|---|---|---|
| 10,360,500 B2 * | 7/2019 | Kabul | ..................... | G06F 9/46 |
| 11,270,201 B2 * | 3/2022 | Sridharan | ............. | G06F 9/5061 |
| 11,423,254 B2 * | 8/2022 | Prakash | .................. | G06F 9/505 |
| 2019/0042946 A1 * | 2/2019 | Sur | ........................ | G06N 3/04 |
| 2019/0114537 A1 | 4/2019 | Wesolowski et al. | | |
| 2019/0279038 A1 * | 9/2019 | Nicol | ..................... | G06N 3/084 |

(Continued)

FOREIGN PATENT DOCUMENTS

WO 2017116924 A1 7/2017

OTHER PUBLICATIONS

Devarakonda, Aditya, Maxim Naumov, and Michael Garland. "Adabatch: Adaptive batch sizes for training deep neural networks." arXiv preprint arXiv:1712.02029 (2017). (Year: 2017).*

(Continued)

*Primary Examiner* — Miranda M Huang
*Assistant Examiner* — Sidney Vincent Bostwick
(74) *Attorney, Agent, or Firm* — Kilpatrick Townsend & Stockton LLP

(57) ABSTRACT

In one example, a method comprises: performing backward propagation computations for a second layer of a neural network to generate second weight gradients; splitting the second weight gradients into a plurality of subsets each associated with a second exchange operation over a computer network, a number of the second weight gradients included in the each subset being based on at least one of first characteristics of the computer network or second characteristics of the neural network; performing backward propagation computations for a first layer of the neural network to generate first weight gradients in parallel with at least one of the second exchange operations; performing a first exchange operation to exchange the first weight gradients after the at least one of the second exchange operations completes; and after the first exchange operation completes, perform the remaining second exchange operations to exchange the remaining subsets of the second weight gradients.

18 Claims, 19 Drawing Sheets

(56) References Cited

U.S. PATENT DOCUMENTS

| | | | |
|---|---|---|---|
| 2019/0332944 A1* | 10/2019 | Bai | G06N 3/04 |
| 2020/0053029 A1 | 2/2020 | Javadi et al. | |
| 2020/0118000 A1* | 4/2020 | Schmidt | G06F 9/546 |

OTHER PUBLICATIONS

Zhao, Tuo, et al. "Accelerated mini-batch randomized block coordinate descent method." Advances in neural information processing systems 27 (2014). (Year: 2014).*

Zhu, Hongyu, et al. "Tbd: Benchmarking and analyzing deep neural network training." arXiv preprint arXiv:1803.06905 (2018). (Year: 2018).*

Naumov, Maxim. "Parallel complexity of forward and backward propagation." arXiv preprint arXiv: 1712.06577 (2017). (Year: 2017).*

Santara, Anirban, et al. "Faster learning of deep stacked autoencoders on multi-core systems using synchronized layer-wise pre-training." arXiv preprint arXiv:1603.02836 (2016). (Year: 2016).*

Lin, Han, et al. "swFLOW: A dataflow deep learning framework on sunway taihulight supercomputer." 2019 IEEE 21st International Conference on High Performance Computing and Communications; IEEE 17th International Conference on Smart City; (Year: 2019).*

Krizhevsky, Alex. "One weird trick for parallelizing convolutional neural networks." arXiv preprint arXiv: 1404.5997 (2014). (Year: 2014).*

Li, Youjie, et al. "Pipe-SGD: A decentralized pipelined SGD framework for distributed deep net training." Advances in Neural Information Processing Systems 31 (2018). (Year: 2018).*

U.S. Appl. No. 16/588,603, "Neural Network Training in a Distributed System," filed Sep. 30, 2019.

Amin et al., "Parallel Backpropagation Neural Network Training Techniques using Graphics Processing Unit," International Journal of Advanced Computer Science and Applications, Jan. 1, 2019, pp. 563-566, vol. 10, No. 2, Available Online at https://thesai.org/Downloads/Volume10No2/Paper_70-Parallel_Backpropagation_Neural_Network_Training.pdf.

Huo et al., "Decoupled Parallel Backpropagation with Convergence Guarantee," Jul. 21, 2018, 12 pages, Available Online at https://arxiv.org/pdf/1804.10574.pdf.

* cited by examiner

NEURAL NETWORK TRAINING IN A DISTRIBUTED SYSTEM

BACKGROUND

Artificial neural networks are computing systems with an architecture based on biological neural networks. An artificial neural network can include a set of weights. Through computations, the weights can be combined with input data to extract information, and a decision can be made based on the information. For example, for a computer vision application to detect an object, the artificial neural network can combine the weights with an input image to extract certain features of the object from the image. Based on the extracted features, the artificial neural network can generate a decision of whether the object is in the image.

The set of weights of an artificial neural network can be generated/updated by a training process, in which the artificial neural network can learn about how to perform a certain computing task for an application. The training process involves supplying the artificial neural network with training input data, which can be labelled with a reference output set which supports a particular decision (e.g., a detection or a non-detection of an object in an image). The artificial neural network can perform computations to combine the weights with the training input data to generate a training output data set, and the training output data set can be compared against the reference output data set to generate a set of differences. During the training, different training input data sets can be provided to the artificial neural network to generate different training output data sets. The set of weights of the artificial neural network can be adjusted based on an objective such as, for example, minimizing the differences between the training output data sets and the reference output data sets.

To improve the likelihood of the artificial neural network generating a correct decision, typically a large volume of training input data covering a large number of operation scenarios is used to train an artificial neural network. As a result, a training operation typically requires a lot of time and computation resources.

BRIEF DESCRIPTION OF THE DRAWINGS

Various embodiments in accordance with the present disclosure will be described with reference to the drawings, in which.

DETAILED DESCRIPTION

Figure 1:
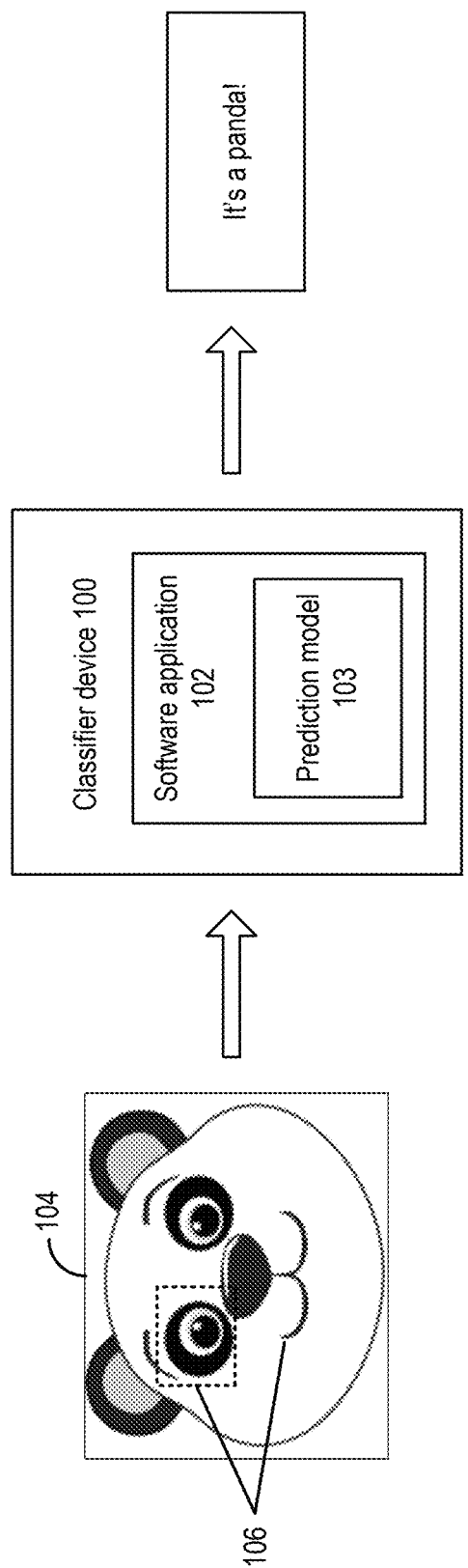
FIG. 1 illustrates an example a classifier device that uses techniques disclosed herein to process data.

Examples of the present disclosure relate to neural network processing, and more specifically, to performing a training process of a neural network in a distributed system.

An artificial neural network (hereinafter, neural network) is typically implemented in a computing system to have an architecture based on biological neural networks, and to process input data in an analogous fashion as biological neural networks. A neural network typically includes a number of cascading neural network layers, with each layer including a set of weights. In an inference operation, a first neural network layer can receive an input data set, combine the input data set with the weights (e.g., by multiplying the input data set with the weights and then summing the products) to generate a first output data set for the neural network layer, and to propagate the output data set to a second neural network layer, in a forward propagation operation. The second neural network layer performs another set of forward propagation operations on the first output data set from the first neural network layer to generate a second output data set, and to propagate the second output data set to higher neural network layers. The forward propagation operations can start at the first neural network layer and end at the highest neural network layer. The forward propagation operations at each neural network layer can represent different stages of extraction and processing of information from the input data set. A decision can then be made based on the output data of the highest neural network layer. For example, each neural network layer can extract and/or process features from an image, and a decision of whether an object is in the image can be generated based on a result of processing the extracted features at the neural network layers.

The set of weights of the neural network can be generated and/or updated by a training process to improve the likelihood of the neural network generating a correct decision. An example training process can use a gradient descent scheme. Specifically, as part of the training process, forward propagation operations can be performed on a training input data set, using the set of weights at each neural network layer, to generate a training output data set at the highest level neural network layer. The training output data set can be compared with a reference output data set that supports a particular decision. A set of input data gradients can be generated based on, for example, differences between the training output data set and the reference output data set.

As part of the training process, each neural network layer can then perform backward propagation operations to adjust the set of weights at each neural network layer. Specifically, the highest neural network layer can receive the set of input data gradients and compute, in a backward propagation operation, a set of first data gradients and a set of first weight gradients based on applying the set of weights to the input data gradients in similar mathematical operations as the forward propagation operations. The highest neural network layer can adjust the set of weights of the layer based on the set of first weight gradients, whereas the set of first data gradients can be propagated to the second highest neural network layer to influence the adjustment of the set of weights of the previous neural network layer. The backward propagation operations can start from the highest neural network layer and end at the first neural network layer. The set of weights at each neural network layer can be adjusted, to complete one iteration of the training process. The training process can be repeated for the same input data set for a number of iterations until a loss objective (e.g., a threshold input data gradient) is achieved.

A training process is typically a very time-consuming process due to the sequential nature and data dependency among the operations involved in the training process. Specifically, as described above, in a training process forward propagation operations are first performed at each neural network layer to compute a training output data set, and then input data gradients are computed based on comparing the training output data set with the reference output data set, and then backward propagation operations can be performed at each neural network layer to compute the weight gradients. Following the generation of the weight gradients, the weights at each neural network layer can be updated based on the weight gradients. Due to the data dependency between backward propagation operations and the forward propagation operations, the two sets of operations cannot performed in parallel. Moreover, due to data dependency between neural network layers, the forward propagation operations and the backward propagation operations also need to be performed sequentially for each neural network layer. The lack of parallelism can drastically increase the training time, which is further increased when multiple iterations of the training process on the same input data set are performed to achieve the loss objective. Moreover, the training process typically involves supplying the neural network with multiple sets of training input data to cover different operation conditions, such that the neural network can be trained to provide a correct decision under those different operation conditions. The computing system that implements the neural network will need to perform additional training processes to process the additional input data sets, which will further increase the training time. Coupled with the fact that the training process typically requires a higher precision than the inference operation, a slow training process can put a lot of stress on the computation resources.

One way to accelerate a training process is by using a distributed system, to distribute the training process across multiple computing systems, each of which can be configured as a worker node. A training input data set can be split into multiple portions, with each portion to be processed by a worker node. Each worker node can perform the forward and backward propagation operations independently, and in parallel with other, based on a portion of the training input data, to generate a set of weight gradients for each neural network layer. Each worker node can exchange its set of weight gradients with other worker nodes, and average its set of weights gradients and the sets of weight gradients received from other worker nodes. Each worker node can have the same set of averaged weight gradients, and can then update a set of weights for each neural network layer based on the averaged weight gradients.

Distributing the training process across multiple worker nodes can reduce the amount of training input data processed at each worker node, which can reduce the times of completion of the forward and backward propagation operations at each neural network layer and accelerate the training process. However, the exchange of weight gradients among the worker nodes can introduce a substantial bottleneck to the training process. For example, in a case where the distributed system is in a cloud infrastructure and the worker nodes exchange weight gradients with each other by sending network packets, the network latency can be substantial relative to the times of completion of the forward/backward propagation operations. The network latency can diminish the reduction in the training time brought by the distributed system, or even increase the training time.

In some examples, to accelerate the training process, the worker node can perform the exchange of at least some of the weight gradients in parallel with the backward propagation and forward propagation operations. Specifically, a worker node can first perform backward propagation operations for a higher neural network layer (e.g., a second layer) to generate second data gradients and second weight gradients, and then perform backward propagation operation for a lower neural network layer (e.g., a first layer) based on the second data gradients to generate first data gradients and first weight gradients. While the backward propagation operations for the first layer are underway, the worker node can exchange at least some of the second weight gradients with other worker nodes over the computer network. After the backward propagation operations for the first layer complete, the worker node can suspend the exchange of the second weight gradients, perform the exchange of the first weight gradients with other worker nodes, update the first weights of the first layer based on the exchanged first weight gradients, and then start forward propagation operations of the first layer (in the next iteration of the training process) based on the updated first weights. While the forward propagation operations of the first layer are underway, the worker node can resume and complete the exchange of the remaining second weight gradients and update the second weights of the second layer based on the exchanged second weight gradients. The worker node can then start forward propagation operations of the second layer based on the updated second weights.

Compared with a case where the exchange of weight gradients are performed only after the backward propagation operations of each layer are complete, the arrangements above can considerably accelerate the training process by parallelizing at least some of the exchange operations with the backward and forward propagation operations, which can reduce the effect of network latency on the overall training process time. Moreover, by suspending the exchange of the second weight gradients to prioritize the exchange of the first weight gradients, the stall time between the backward propagation operations and the forward propagation operations of the first layer can be reduced. The forward propagation operations of the first layer have to be suspended until the exchange of the first weight gradients and the updating of the first weights (based on the exchanged first weight gradients) are complete, since the forward propagation operations use the updated first weights. The suspension of the forward propagation operations of the first layer adds to the stall time. As the exchange of the first weight gradients is the last operation before the forward propagation operations of the next iteration starts, the exchange of the first weight gradients cannot be parallelized with other operations and will add to the overall training process time. By suspending the exchange of the second weight gradients, the exchange of the first weight gradients can start as soon as the first weight gradients are generated, which also allows the exchange of the first weight gradients to complete sooner and reduces the stall time.

To facilitate the management and the prioritization of the exchange of the weight gradients, the weight gradients for each layer can be split into subsets, with each subset being associated with an exchange operation and including a number (or a certain data size) of the weight gradients. Referring to the examples above, the worker node can complete one or more exchange operations for the second layer while the backward operations for the first layer is underway, and then switch to the exchange operations for the first layer, and then switch back to the remaining exchange operations for the second layer.

The training time can be reduced if more exchange operations of the weight gradients can be performed in parallel with the backward and forward propagations, which can reduce the delay introduced to other operations that follow the exchange operations. In the illustrative example above, the training time can be minimized when the exchange operations of the subsets of second weight gradients (generated by the backward propagation operations of the second layer) are completely in parallel with the backward propagation operations and forward propagation operations of the first layer. As a result, the exchange of the first weight gradients can start soon after the backward propagation of the first layer is complete, which can reduce the stall time before the forward propagation operations of the first layer. Moreover, the exchange operations of the remaining second weight gradients can be completed before the forward propagation operations of the second layer starts, which can reduce the stall time before the forward propagation operations of the second layer.

A particular choice of a number (or data size) of weight gradients exchanged in an exchange operation, however, can reduce the parallelism between the exchange operations of the second weight gradients and the forward and backward propagation operations, and the training time may increase as a result. As an example, if the second weight gradients are split into very large subsets each including a large number of second weight gradients, the time of completion of a first exchange operation of a first subset of the second weight gradients can be substantial and may extend beyond the backward propagation operations for the first layer. As a result, the subsequent exchange operations of the first weight gradients may need to stall for a substantial stall time until the first exchange operation is complete. The stall time increases the training time, as explained above. This problem can be further exacerbated when, for example, the first layer is very small, such that the time of completion of the backward propagation operations for the first layer is short.

In some cases, splitting the second weight gradients into small subsets may also increase the training time, such as in a case where the weight gradients are exchanged over a slow computer network. Specifically, as each exchange operation involves a fewer number of second weight gradients, the exchange of the remaining second weight gradients may require a larger number of exchange operations. Moreover, each exchange operation typically includes overhead time, such as the time for preparing the weight gradients for the exchange operation, the time for generating network packets from the weight gradients, the time for a handshake between worker nodes to establish a communication channel to exchange the weight gradients, etc. The accumulation of the overhead time across the exchange operations can further increase the time of completion of the exchange operations. As a result, the exchange of the remaining second weight gradients may not be complete before the end of the forward propagation operations for the first layer. The forward propagation operations for the second layer may need to stall for a substantial stall time until the exchange operations of the second weight gradients and the updating of the second weights complete. The stall time also increases the overall training time. Moreover, the share of time the network is used in the transmission of the weight gradients (versus, e.g., the transmission of handshake information) can be reduced, which can degrades the network efficiency in the transmission of the weight gradients.

From the examples above, it can be seen that setting a fixed number of weight gradients in an exchange operation, irrespective of the characteristics of the computer network or the characteristics of the neural network, can increase the training time.

Examples of the present disclosure relate to neural network processing, and more specifically, to performing a training process of a neural network in a distributed system. The neural network includes at least a first layer, and a second layer which receives output from the first layer as input. In one example, a distributed system includes a plurality of worker nodes connected via a computer network.

As part of the training process, each worker node receives a portion of a training input data set and performs forward propagation computations on the respective portion to generate input data gradients. Following the generation of input data gradients, each worker node can perform backward propagation operations of the second layer based on the input data gradients to generate second data gradients and second weight gradients. Each worker node can divide the second weight gradients into subsets, with each subset including a pre-determined number of second weight gradients to be exchanged with other worker nodes in an exchange operation. The number of second weight gradients included in each subset is adapted to the characteristics of the computer network and/or the characteristics of the neural network.

The worker node can then perform backward propagation operations of the first layer to generate first weight gradients in parallel with one or more of the exchange operations of the subsets of the second weight gradients. After the first weight gradients are generated, the worker node can complete the exchange operation of a subset of the second weight gradients that is in progress, and then the worker node can perform the exchange operations of the first weight gradients. After the exchange operations of the first weight gradients complete, the worker node can update first weights of the first layer based on the exchanged first weight gradients, and then start forward propagations of the first layer based on the updated first weight. The worker node can perform the remaining exchange operations of the subsets of the second weight gradients in parallel with the forward propagation operations of the first layer. After completing the remaining exchange operations, the worker node can update second weights of the second layer, and then perform forward propagation operations of the second layer.

By adapting the number of second weight gradients exchanged in each exchange operation to the characteristics of the computer network and/or the characteristics of the neural network, the training time can be reduced. For example, if the first layer of the neural network is relatively small, such that the time of completion of the backward propagation operations of the first layer is also relatively short, a smaller number of second weight gradients can be included in the subset for each exchange operation. As described above, one or more of the exchange operations of the second weight gradients are performed in parallel with the backward propagation operations of the first layer. By reducing the number of second weight gradients in the exchange operations, it becomes more likely that the exchange operations complete before the backward propagation operations of the first layer are complete and generate the first weight gradients, thus the stall time incurred by the exchange of the first weight gradients can be reduced, which can reduce the training time.

On the other hand, if the computer network has a relatively low bandwidth, a larger number of second weight gradients can be included in the subset for each exchange operation. Including a larger number of second weight gradients in each exchange operation can reduce the number of exchange operations, which in turn can reduce the impact of the accumulative overhead time and improve the transmission efficiency (in transmitting the weight gradients) of the computer network. This can speed up the exchange operations of the second weight gradients and can reduce that the stall time of the forward propagation operations of the second layer, and the training time can be reduced as well.

In some examples, an optimal number of weight gradients exchanged in an exchange operation that minimizes the training time can be determined. The determination of the optimal number can be based on a trade-off between the benefits and penalties of dividing the weight gradients into a certain number of exchange operations. The benefits may include reducing the stall time of the weight exchange operation of the lower layer, whereas the penalties may include increasing the overall time of the exchange operations of the weight gradients of a higher layer due to the impact of the overhead accumulated across the exchange operations. In the illustrative example above, by splitting the second weight gradients into smaller subsets, the wait time incurred by the exchange of the first weight gradients can be reduced. But such benefit comes at the costs of a larger number of exchange operations of the second weight gradients and (due to the accumulative overhead time) a longer time of completion of the exchange operations of the second weight gradients. If the exchange operations of the second weight gradients have been completed long after the forward propagation operations of the first layer, substantial stall time can be introduced to the forward propagation operations of the second layer which depend on the exchange of the second weight gradients. If the increase in the stall time of the forward propagation operations of the second layer is larger than the decrease in the wait time of the exchange operations of the first weight gradients, the costs outweigh the benefits, and the number of second weight gradients in each exchange operation can be increased. In contrast, if the increase in the stall time of the forward propagation operations of the second layer is smaller than the decrease in the wait time of the exchange operations of the first weight gradients, the number of second weight gradients in each exchange operation can be decreased. An optimal number is achieved when, for example, the changes in the two stall times are almost identical, and the parallelism between the exchange operations and the backward/forward propagation operations is maximized for a given neural network and a given computer network. As illustrated above, the costs and benefits may vary for different computer networks and different neural networks, different combinations of computer networks and neural networks may have different optimal numbers of weight gradients included in an exchange operation.

In some examples, the exchange operations of multiple layers can be merged together to further reduce the training time. For example, instead of exchange weight gradients of two layers in two different groups of exchange operations, the weight gradients can be combined and split into subsets, and one group of exchange operations can be used to exchange subsets of the weight gradients of the two layers. Such arrangements can reduce the training time when, for example, the two layers are very small, which results in a small number of weight gradients being exchanged. In such a case, merging the exchange operations of the two layers can reduce the number of exchange operations as well as the impact of overhead time and can improve, which can improve the efficiency of the computer network and reduce the training time.

In some examples, the number of weight gradients included in an exchange operation for each layer of a neural network, and whether or not to merge the exchange operations across multiple layers, can be determined from a profile configuration. The profile configuration can indicate, for a given set of characteristics of a neural network (e.g., the topology of the neural network, the sizes and connectivity of each layer of the neural network, etc.), and/or for a given set of characteristics of the computer network (e.g., a bandwidth of the computer network, a topology of the computer network, a packet size of the computer network, a threshold transmission efficiency of the computer network, etc.), the number of weight gradients included in an exchange operation for each layer of a neural network that can minimize the training time. The profile configuration can also indicate whether or not to merge the exchange operations across multiple layers, and the number of weight gradients from the multiple layers to be included in each exchange operation, to minimize the training time. Multiple profile configurations for different combinations of characteristics of neural networks and computer networks can be provided. A profile configuration having the matching neural network and/or computer network characteristics can be selected, and a training process can be configured based on the selected profile configuration.

In some example, the profile configuration can be generated by performing multiple iterations of training operations of a neural network in a distributed system having a computer network of certain characteristics. The iterations of training operations to determine the profile configuration can be based on a subset of the training data involved in a full training operation that updates the weights for future inferencing operations. Each training operation having a candidate configuration which sets a candidate number of weight gradients in each exchange operation of each layer. In one example, the candidate numbers of weight gradients can be identical for all layers, or different for different layers, in a particular configuration. Multiple iterations of the training processes can be performed for each candidate profile configuration, and the candidate profile configuration that gives the minimum time of completion of the multiple iterations can be selected as the profile configuration for the neural network and for the computer network. Other profile configurations can be generated for other neural networks in other distributed systems having, for example, computer networks of different characteristics.

The candidate numbers can be based on scaling from a start value, random functions (e.g., based on a Gaussian distribution around the start value), etc. The start value can be based on, for example, a common parameter of a computer network. For example, a computer network may require a minimum number of weight gradients in an exchange operation to maintain a minimum threshold of transmission efficiency, and the candidate numbers can be based on the minimum threshold. In a case where the number of weight gradients generated by a layer is lower than the minimum threshold, the exchange operations of that layer can be merged with other layers to reduce the overhead, as described above. The selection of the layers to merge the exchange operations, as well as the candidate number of weight elements included in the merged exchange operations, can become part of the candidate profile configurations.

With the described techniques, the weight gradients of each layer can be exchanged in multiple exchange operations, which can facilitate prioritization of exchange for lower layers and can reduce the training time. Moreover, by splitting the weight gradients into subsets based on the characteristics of the neural network and the computer network, more parallelism can be achieved between the exchange of weight gradients and the forward and backward propagation operations, which can further reduce the training time. All these can improve the efficiency of the training process and can reduce the stress on computation resources.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an example classifier device 100 that uses techniques disclosed herein to process data. Classifier device 100 can be, for example, a computing device operating a software application 102 and a prediction model 103 to predict information included in a data sequence, and perform a predetermined function based on the prediction. For example, classifier device 100 can be part of an image recognition service provided to identify certain objects (e.g., text, a person, etc.) from an image. It is understood that the image recognition service is merely provided as an illustrative example, and that techniques disclosed herein can be used for other data processing applications including, for example, text-based data processing (e.g., processing of search queries), audio data processing, etc. Moreover, classifier device 100 may operate a number of different prediction models to process different input data, either in parallel or at different times.

In some examples, the image recognition service can be provided in a multi-tenant compute service system. The multi-tenant compute service system may typically include a plurality of servers that can host data and be used by multiple clients or organizations to run instances, such as virtual machine instances or bare-metal instances (e.g., operating systems that run directly on the server hardware). In most instances, such as bare-metal or virtual machine instances, a multi-tenant compute service system may be allocated to a client when the client needs them and decommissioned when they are no longer needed, such that the resources can be reallocated to other clients. In the present disclosure, the terms "tenant," "client," and "customer" may be used interchangeably, although such terms do not necessarily imply the existence of any particular business arrangement. The term "instance" may refer to, for example, an instance that is executed directly on server hardware or as a virtual machine. Different types of instances generally correspond to different hardware functions and/or arrangements of hardware (e.g., different amounts of available memory and/or processing hardware). In the example of FIG. 1, the multi-tenant compute service system may provide the image recognition service when the client needs it, and the service is decommissioned when it is no longer needed, such that the resources supporting the image recognition service (e.g., access to software application 102, and the underlying hardware resources for processing software application 102) can be reallocated to other clients. Different clients (or one client) may request application 102 to perform processing of different input data using the same or different prediction models including prediction model 103.

In the example of FIG. 1, software application 102 can receive pixel data of an image 104 from a user. Image 104 may include an array of pixels. Software application 102 can perform analysis on the pixel data, and predict one or more objects 106 depicted in image 104. The analysis may include, for example, comparing the pixel data against a set of predetermined features data. The predetermined features data may include data associated with a set of predetermined visual image features such as, for example, a nose object, a mouth object, etc. The predetermined features data may also include data associated with non-visual image features, or a combination of visual and non-visual image features. As to be discussed in more detail below, software application 102 may employ prediction model 103 to compute a set of scores based on the pixel data of image 104. The set of scores may represent, for example, the likelihood of image 104 including the image features represented by the features data. Software application 102 can then determine other information about the content of image 104 based on the scores. For example, based on the scores, software application 102 can determine that image 104 is an image of, for example, a panda, a cat, or other objects.

Prediction model 103 can be in the form of an artificial neural network. The artificial neural network may include a plurality of processing nodes, with each processing node configured to process part of the input pixel data, or to further process the intermediate outputs from other processing nodes. FIG. 1 illustrates an example of prediction model 103 that uses techniques disclosed herein. In FIG. 1, prediction model 103 may be a multi-layer neural network such as a deep neural network (DNN), a convolutional neural network (CNN), etc. Prediction model 103 may include an input layer 207, a set of intermediate layers including intermediate layers 209 and 211, and an output layer (not shown in FIG. 2A). It is understood that prediction model 103 can also include other different types of neural networks including, for example, long short-term memory (LSTM), multilayer perception (MTP), multiscale densenet (MSD-NET), etc.

Layer 207 may process pixel data representing different portions of image 104. For example, in the example of FIG. 2A, layer 207 may process the pixel data of image 204. Each processing node of layer 207 is assigned to receive a pixel value (e.g., $x_0$, $x_1$, $x_2$, ... $x_n$) corresponding to a predetermined pixel within image 104, and transmit one or more weights with the received pixel value to layer 209. In a case where prediction model 203 is a DNN, each processing node of layer 207 can be assigned a set of weights defined based on a matrix W1. Each processing node of layer 207 can send the received pixel value and the assigned weights to each processing node of layer 209. In a case where prediction model 103 is a CNN, groups of the processing nodes of layer 207 may share a set of weights, and each group may send the set of weights and the pixel values received by the group of processing nodes to a single processing node of layer 209. Different neural network models may include different topologies (e.g., including a different number of layers, different connections between layers, etc.), and/or include a different set of weights for each layer.

Layer 209 may process the scaled outputs from layer 207 to generate a set of intermediate outputs. For example, assuming processing node $210a$ of layer 209 is connected to n processing nodes in layer 207, processing node 210a may generate a sum of the scaled outputs received from layer 207 based on the following equation:

$$sum_{210a} = \sum_{i=0}^{n}(W1_i \times x_i) \quad \text{(Equation 1)}$$

Here, $sum_{210a}$ represents an intermediate output generated by processing node 210a. $W1_i \times x_i$ represents a scaling of a particular pixel value (e.g., $x_0$) with the associated weight (e.g., $W1_0$) by a processing node of layer 207. In a case where prediction model 103 is a DNN, each processing node of layer 209 may generate the sum based on the scaling of pixel values from each processing node of layer 207, and then generate a sum (e.g., $Sum_{210a}$) by summing the scaled pixel values. The sum may also represent a dot-product between an input vector comprising a number of elements (e.g., pixel values) and a weight vector (e.g., W1). In some examples, a bias can also be added the scaled outputs to generate the intermediate output.

In a case where prediction model 103 is a CNN, each processing node of layer 209 may generate the intermediate output based on the scaling of pixel values from a group of processing nodes of layers 207. The intermediate output may represent a convolution result between a group of pixel values and a filter comprising the weight values. FIG. 2B illustrates an example of a convolution operation that layer 209 may perform. In FIG. 2B, filter 230 may include a two-dimensional array of weights. The weights in filter 230 may represent a spatial distribution of pixels for certain features to be detected from the image. The two-dimensional array may have a height of R rows and a width of S columns, and is typically smaller than an input image with a height of H pixels and a width of W pixels. Each weight may be mapped to a pixel in a rectangular block of pixel values with the same R rows and S columns. A processing node of layer 209 (e.g., processing node 210a) can receive, from a group of processing nodes of input layer 207, a group 240 of pixel values corresponding to a first rectangular block of pixels from the input image, which corresponds to a first stride location of filter 230, and generate a convolution output 242 based on a summation of multiplication results between each weight of filter 230 and each corresponding pixel in group 240 according to Equation 1, to generate a dot-product between a matrix represented by filter 230 and a matrix represented by group 240. Another processing node of layer 209 can also receive, from another group of processing nodes of input layer 207, a group 244 of pixel values corresponding to a second rectangular block of pixels from the input image corresponding to a second stride location of filter 230, and generate a convolution output 246 based on a summation of multiplication results between each weight of filter 230 and each corresponding pixel in group 244 according to Equation 1, to generate a dot-product between the matrix of filter 230 and a matrix represented by group 240. In some examples, each convolution output in FIG. 2B (e.g., convolution output 242, convolution output 346, etc.) can correspond to the output of a processing node of layer 209. In some examples, the pixel data in the input image may be referred to as an input feature map to indicate that the pixels are processed by the same filter (or same sets of filters) corresponding to certain feature(s). The convolution outputs may be referred to as an output feature map to indicate that the output is the result of processing an input feature map with the filter.

As shown in FIG. 2B, the convolution operations can be arranged in a sliding-window such that the second rectangular block overlaps, or is otherwise adjacent to, the first rectangular block in the input image. For example, in the example of FIG. 2B, D may be a distance of stride (in pixel) of the sliding-window for each convolution operation, such that the block of pixels corresponding to group 244 may be situated at a distance D (in terms of pixels) from the block of pixels corresponding to group 240, and the next block of pixels may also be situated at the same distance D from group 244. Other processing nodes of layer 209 may also receive groups of pixels corresponding to other rectangular blocks and generate other intermediate outputs. The convolution outputs can be part of a convolution output array. The array of convolution outputs can have a smaller height and a smaller width than the input image. Rectangular blocks of the convolution outputs can be further grouped, and convolution operations can be performed at layer 211 between the groups of convolution outputs and another set of filter weights to generate another set of convolution outputs.

Referring back to FIG. 2A, one processing node of layer 209 may be configured to generate the convolution output elements of one convolution output array, and a set M of processing nodes of layer 209 can correspond to a set M of convolution output arrays. The processing node of layer 209 can also process each convolution output with an activation function to generate an activation output. The activation function may translate the convolution output into a decision of whether to forward the convolution output to intermediate layer 211 to influence the classifier decision (analogous to the firing of a biological neuron). An example of the activation function can be a rectified linear unit (ReLU) defined according to the following equation:

$$ReLU(x) = \begin{cases} x & \text{for } x \geq 0 \\ 0 & \text{for } x < 0 \end{cases} \quad \text{(Equation 2)}$$

In addition to ReLU, other forms of activation function can also be used including, for example, a softplus function (which can be a smooth approximation of a ReLU function), a hyperbolic tangent function (tanh), an arc tangent function (arctan), a sigmoid function, a Gaussian function, etc.

A processing node of layer 209 (e.g., processing node 210a) may process the sum with the ReLU function to generate a first output of layer 209 based on the following equation:

$$\text{first\_output}_{210a} = ReLU(Sum_{210a}) \quad \text{(Equation 3)}$$

Optionally, prediction model 103 may include a pooling layer to reduce the number of intermediate outputs (e.g., $sum_{210a}$) of layer 209. The pooling layer may group the intermediate outputs and perform a pooling operation on each group. The pooling operation may include such as max pooling (e.g., selecting a maximum intermediate output within the group), min pooling (e.g., selecting a minimum intermediate output), average pooling (e.g., finding an average of each group), summation pooling (finding a sum of each group), etc., and the reduced intermediate outputs can be processed by the activation function to generate first outputs of layer 209. The pooling operation can be performed to reduce the computation cost associated with activation function processing.

Layer 211 may further process the scaled intermediate outputs from layer 209 by, for example performing additional convolution operations based on different sets of filters. The outputs from each processing node of layer 211 may be forwarded to other higher intermediate layers, or to an output layer (not shown in FIG. 2A). The output layer may form an output vector representing, for example, a probability that certain features are included in image 104, and/or a probability that image 204 includes an image of a panda. For example, the output vector may be compared against a reference vector associated with a nose object of a panda, or a reference vector associated with a panda. A decision about whether image 104 is an image of a panda can be determined based on the comparison result.

Figure 2A:
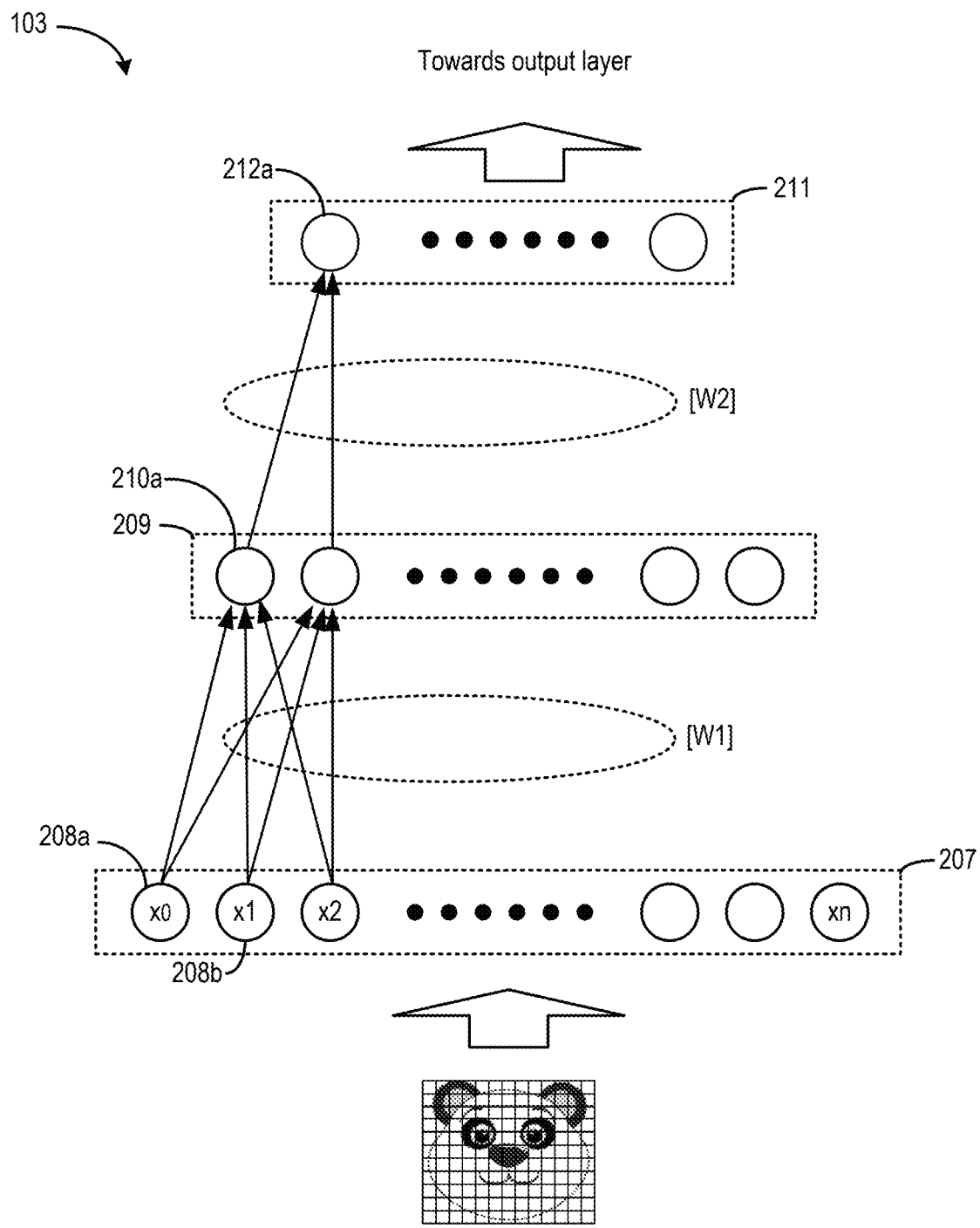
FIGS. 2A-2B are simplified block diagrams illustrating a prediction model and the computations that use techniques disclosed herein, according to certain aspects of the present disclosure.
Figure 2B:
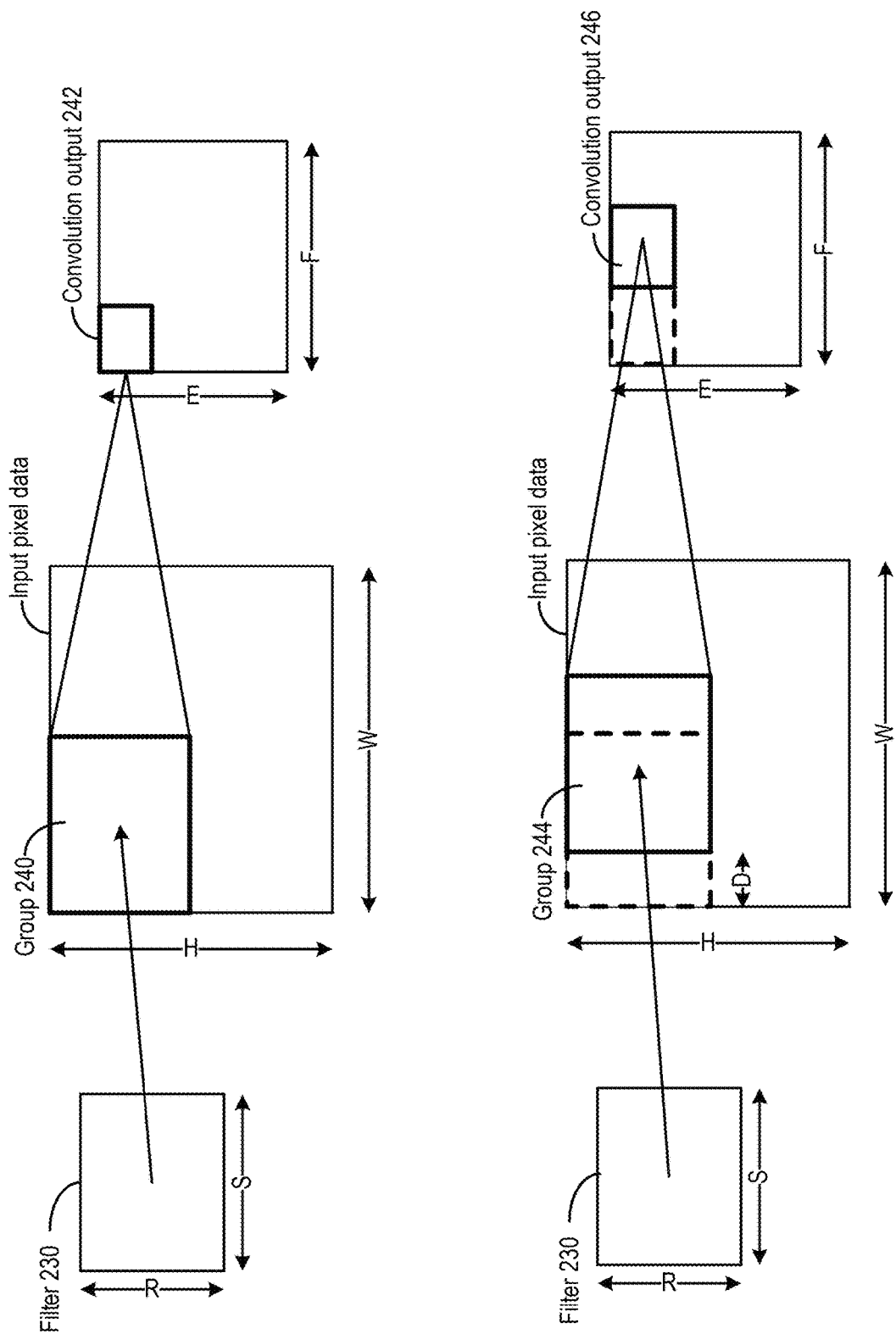

The weights and filter coefficients described in FIG. 2A and FIG. 2B can be generated and updated by a training process, to improve the likelihood of prediction model 103 generating a correct decision. Referring to the examples of FIG. 2A and FIG. 2B, prediction module 103 can be trained based on a set of training images. The training images can include images of different pandas, images of other animals and other artifacts, etc. Prediction model 103 can process those images and generate different output vectors. The weights in the neural network layers of prediction model 103 can be updated to maximize the number of correct decisions (e.g., detection of a panda in training images that contain a panda, non-detection of a panda in training images that do not contain an panda, etc.) by the prediction model 103.

Figure 3A:
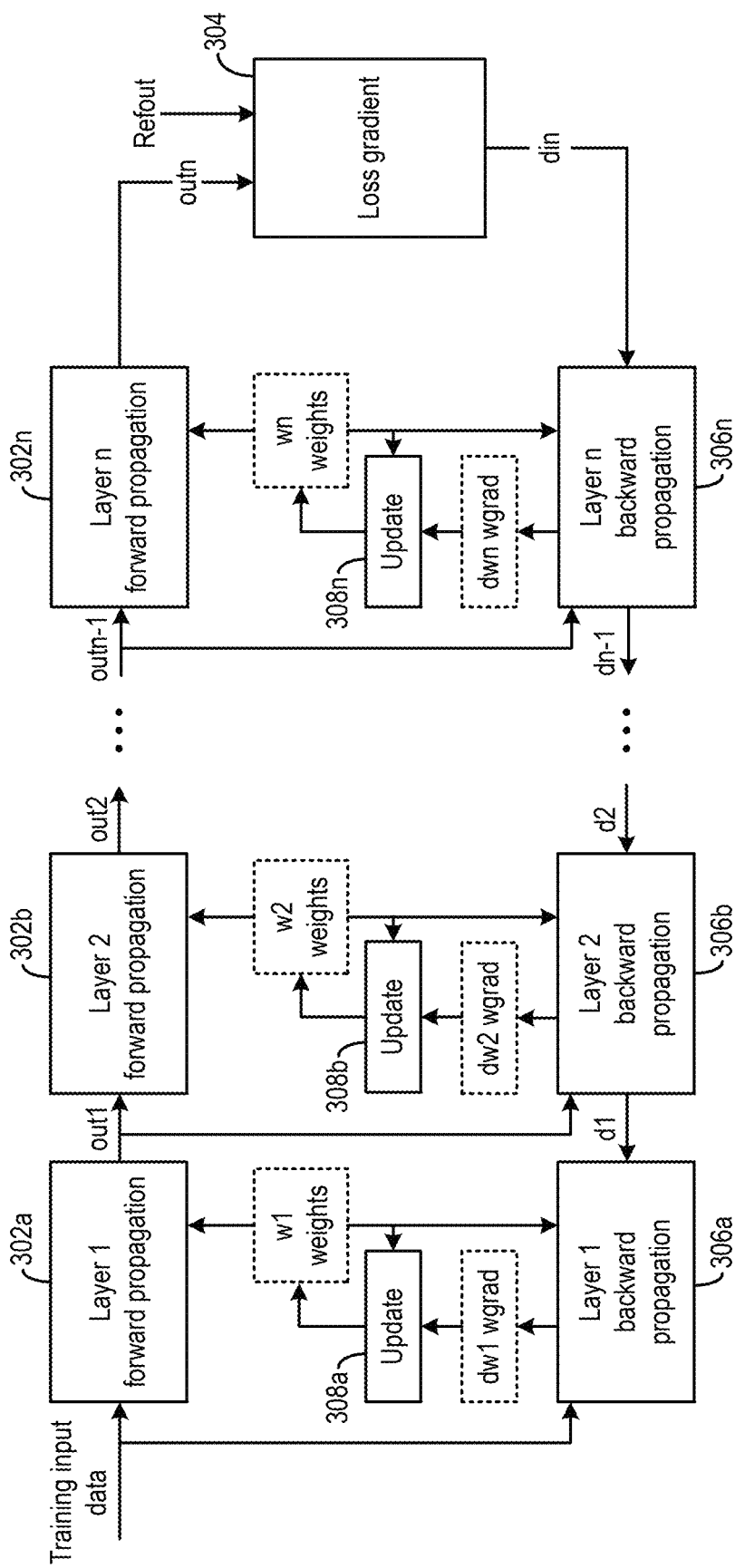
FIGS. 3A-3C illustrate examples of a training process of a neural network.

FIG. 3A illustrates an example of a training process 300 to train a neural network, including the neural network of prediction model 103. A training process can be performed by, for example, a neural network hardware accelerator that implements the neural network, a general purpose hardware processor, or other suitable computing systems that support the arithmetic operations involved in neural network processing as described above. The training can be based on a gradient descent scheme, which includes forward propagation operations, loss gradient operation, and backward propagation operations. Specifically, as shown in FIG. 3A, a forward propagation operation can be performed for each neural network layer, such as a forward propagation operation 302a for the lowest layer 1 (which can correspond to input layer 207 of FIG. 2A), a forward propagation operation 302a for layer 2 (which can correspond to layer 209 of FIG. 2A), a forward propagation operation 302n for the highest layer n (which can correspond to layer 211 of FIG. 2A), etc. A forward propagation operation at a neural network layer can include the multiplication and summation computations between input data and a set of weights for that layer, followed by activation function processing, as described above in Equations 1 and 2, to generate output data. The output data can then propagate to the next neural network layer as input to the forward propagation operation at that layer. For example, as shown in FIG. 3A, forward propagation operation 302a can combine training input data with W1 weights of layer 1 to generate output data out1, which propagate to layer 2 as input. Forward propagation operation 302b can combine data out1 with W2 weights of layer 2 to generate output data out2, which can then propagate to the next layer. At the highest layer n, forward propagation operation 302n receive data outn−1 from layer n−1 (not shown in FIG. 3A), combine with Wn weights of layer n, and generate output data outn.

A loss gradient operation 304 can compare the output data outn of layer n against reference output data refoutn to generate input data gradients din. The input data gradients din can measure a rate of difference between outn and refoutn with respect to each data element of output data outn. In some examples, an objective of the training is to minimize the difference between outn and refoutn such that the input data gradients din become close to zero.

Following the generation of input data gradients din by loss gradient operation 304, a backward propagation operation 306 can be performed for each neural network layer. For example, a backward propagation operation 306n can be performed at highest layer n, a backward propagation operation 306b can be performed at layer 2, a backward propagation operation 306a can be performed at layer 1. A backward propagation operation at a neural network layer can be based on the weights of that neural network layer, the data gradient input to that neural network layer, as well as the input to the forward propagation operation of that layer. For example, for layer n, backward propagation operation 306n can receive, as inputs, weights wn, input data outn−1 (from forward propagation operation at neural network layer n−1), and input data gradient din. The backward propagation operation can perform multiplication and summation computations similar to those of Equation 1 on the input to generate output data gradients (dn−1, d2, d1, etc. in FIG. 3A) and weight gradients wgrad (dwn, dw2, dw1, etc. in FIG. 3A). The output data gradients can be forwarded to the next lower neural network layer as inputs to the backward propagation operation in that layer, whereas the weight gradients can represent changes to be applied to weights at a neural network layer. The weights at layer n can be updated by an update operation 308 (e.g., update operation 308n for layer n) based on the weight gradients dwn based on the following equation:

$$wn'=wn-\alpha \times dwn \quad \text{(Equation 4)}$$

In Equation 4, wn' can refer to the updated weights wn, whereas α can include a set of pre-determined constants.

The output data gradients dn−1 generated by layer n can then propagate to the next lower neural network layer n−1 as input to the backward propagation operation at that layer. Backward propagation operation 302b of layer 2 can operate on data gradients d2, weights w2, and input data out1 to generate output data gradients d1 as well as weight gradients dw2. Weight gradients dw2 can be used by update operation 308b to update w2 weights based on Equation 4. Data gradients d1 can propagate to layer 1. Backward propagation operation 302a of layer 1 can operate on data gradients d2, weights w1, and training input data to generate weight gradients dw1. Weight gradients dw1 can be used by update operation 308a to update w1 weights based on Equation 4.

A training process typically involves supplying the neural network with multiple sets of training input data to cover different operation conditions, such that the neural network can be trained to provide a correct decision under those different operation conditions. Due to limited computation resources, the computing system (e.g., a neural network hardware accelerator) typically lacks the capability to use all the training input data sets at one time to perform the training. Instead, the training input data can be split into multiple portions. The computing system can perform the training process sequentially in batches, with each batch to operate on a portion of the training input data.

Figure 3B:
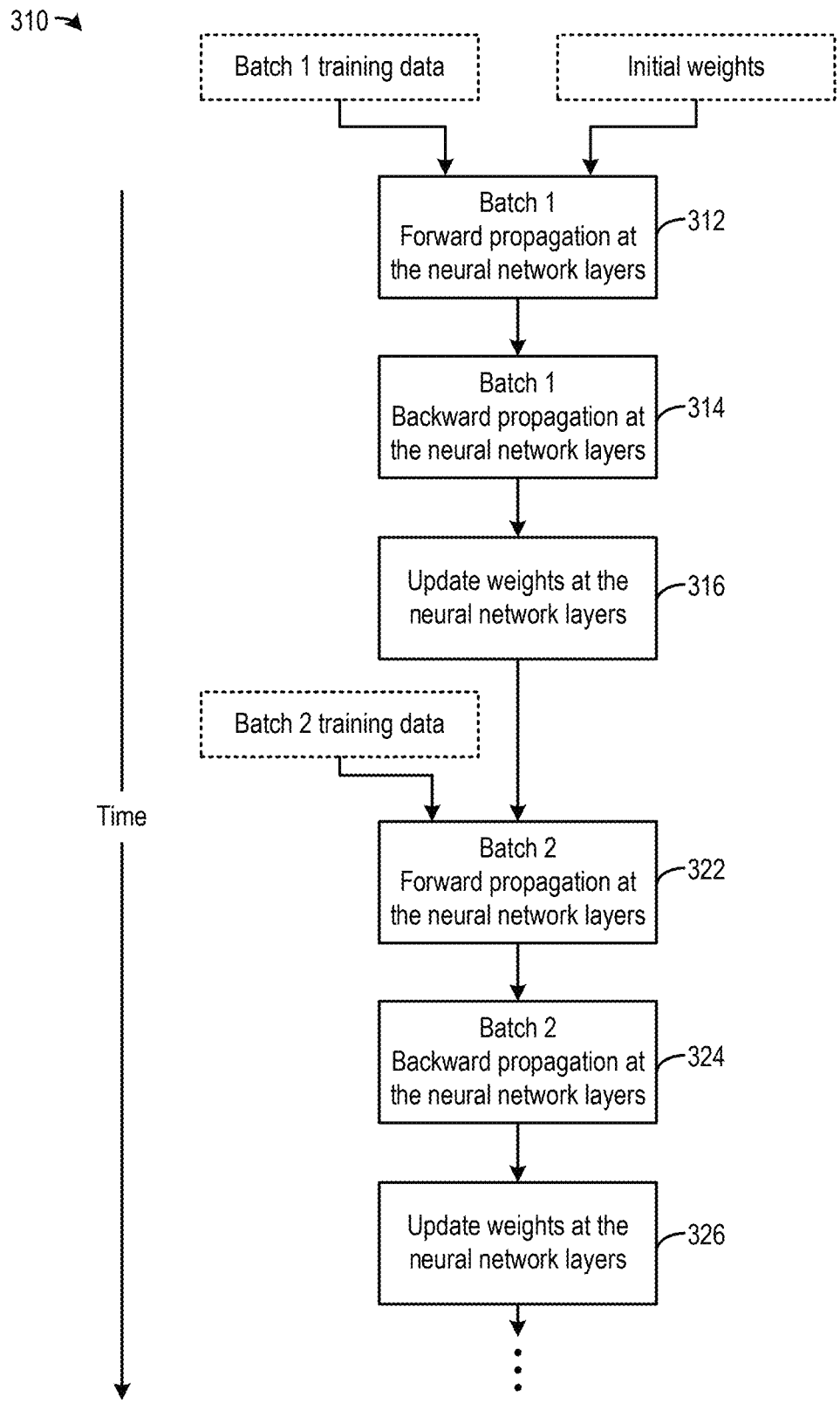

FIG. 3B illustrates an example 310 of batches of a training process with respect to time. As shown in FIG. 3B, a batch 1 training operation can be performed, which comprises operations 312, 314, and 316. In operation 312, forward propagation operations can be performed at each neural network layer based on batch 1 training input data and initial weights. And then in operation 314, backward propagation operations can be performed at each neural network layer based on the outputs of operation 312, followed by operation 316 in which the weights at each neural network layer are updated based on the weight gradients from the backward propagation operations in operations 314. After the batch 1 training operation is complete, batch 2 training operation can be performed, which comprises operations 322, 324, and 326. Operation 322 includes forward propagation operations based on batch 2 training input data and the updated weights from batch 1 training operations, operation 324 includes backward propagation operations based on the outputs of operation 322, followed by operation 326 in which the weights at each neural network layer are further updated based on the weight gradients from the backward propagation operations in operations 324. Following the completion of batch 2, other batches of training operations can be performed on other portions of the training input data. The batches of training operations can also be repeated in multiple iterations until, for example, the input data gradients din from loss gradient operation 304 become close to zero, which indicates that the differences between training outputs outn and reference outputs refout are minimized.

As shown in FIG. 3B, a training process performed on a single computing system can be very time-consuming due to the sequential nature of the training process. Specifically, as described above, in a training process a forward propagations is first performed at each neural network layer to compute a training output data set, and then input data gradients are computed based on the training output data set (and reference output data set), and then a backward propagation is performed at each neural network layer to compute the weight gradients, which is then followed by the updating of the weights at each neural network layer. As the backward propagation operations depend on the forward propagation operations, the two sets of operations cannot performed in parallel. This is evident in FIG. 3B, in which the backward propagation operations are performed after the forward propagation operations, and the weight update operations are performed after the backward propagation operations. Moreover, due to data dependency among the neural network layers, the forward propagation operations and the backward propagation operations also need to be performed sequentially for each neural network layer. The lack of parallelism can drastically increase the training time, which is further increased when multiple batches of the training process are performed for different portions of the training input data set, and the batches are repeated in multiple iterations to converge towards minimum data gradients.

Figure 3C:
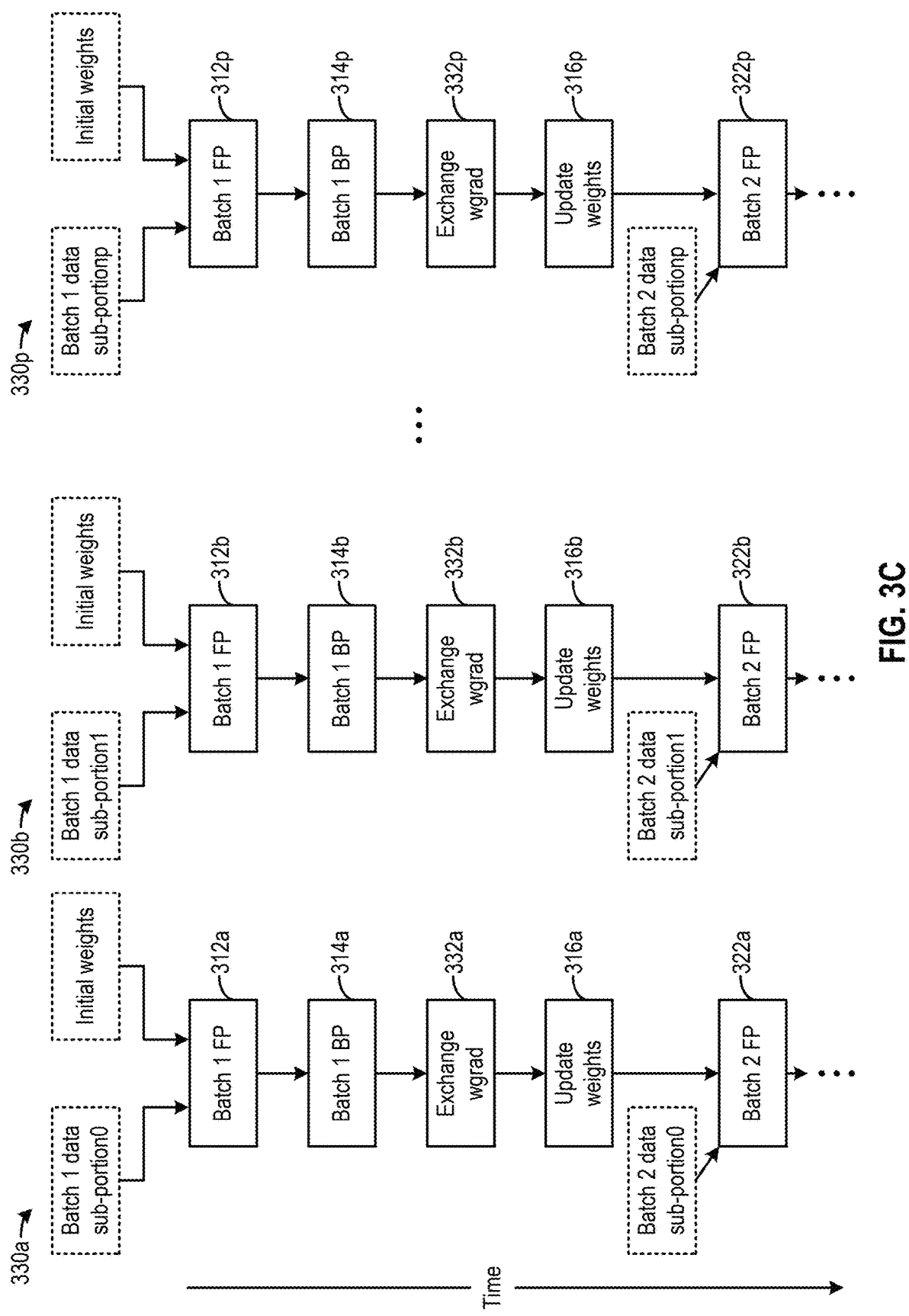

One way to accelerate a training process is by using a distributed system, to distribute the training process across multiple computing systems, each of which is configured as a worker node. Specifically, referring to the batch example of FIG. 3B above, each portion of training input data can be further subdivided into sub-portions, with each sub-portion to be processed in a parallel training process by each worker node of the distributed system. FIG. 3C illustrates an example of the parallel training processes in a distributed system. As shown in FIG. 3C, a portion of training input data for a batch training operation can be further subdivided into a sub-portion 0, a sub-portion 1, a sub-portion p, etc. A parallel training process (e.g., training processes 330a, 330b, 330p, etc.) can be performed at each worker node. For example, at around the same time, each worker node can perform operation 312 (e.g., 312a, 312b, 312p, etc.), which includes forward propagation operations, based on the respective sub-portion of training input data and the same set of initial weights. Following the completion of the forward propagation operations, each worker node can perform operation 314 (e.g., 314a, 314b, 314p, etc.), which includes backward propagation operations. Each worker node can perform its respective operation 314 at around the same time to generate weight gradients for each neural network layer. The weight gradients are generated by each worker node based on a respective sub-portion of the training input data received by the worker node.

Following the completion of the backward propagation operations, each worker node can perform an exchange operation 332 (e.g., 332a, 332b, 332p, etc.) to exchange the weight gradients generated at the each worker node with other worker nodes. Each exchange operation includes a worker node transmitting a set of weight gradients for each neural network layer to each of other worker nodes. The worker node can average its set of weight gradients and the sets of weight gradients received from other worker nodes. At the end of exchange operation 332, each worker node can have the same set of averaged weight gradients. Each worker node can then perform operation 316 (e.g., 316a, 316b, 316p, etc.) to update the weights for each neural network layer based on the averaged weight gradients, and then start batch 2 forward propagation operation 322 (e.g., 322a, 322b, 322p, etc.) in parallel based on the updated weights.

Distributing the training process across multiple worker nodes can reduce the amount of training data to be processed at each worker node, which can reduce the time of completion of the forward and backward propagation operations and accelerate the training process. For example, as the volume of training data processed by each worker nodes has been reduced, the durations of the forward propagation operation 312 and backward propagation operation 314 in FIG. 3C can be shorter than the durations of the same operations in FIG. 3B. However, the exchange of the weight gradients among the worker nodes, in operations 332, can introduce substantial bottleneck to the training process. For example, in a case where the distributed system is in a cloud infrastructure and each worker node exchange weight gradients with each other by sending network packets, the network latency can be substantial relative to the times of completion of the forward/backward propagation operations. As a result, the duration of exchange weight gradients operations 332 can be much larger than that of the forward propagation operations 312 and backward propagation operations 314. As the weight gradients exchange operations 332 are serialized with forward propagation operations 312 and backward propagation operations 314, the weight gradients exchange operations 332 can add significant delay to the training process and increase the training time.

Figure 4A:
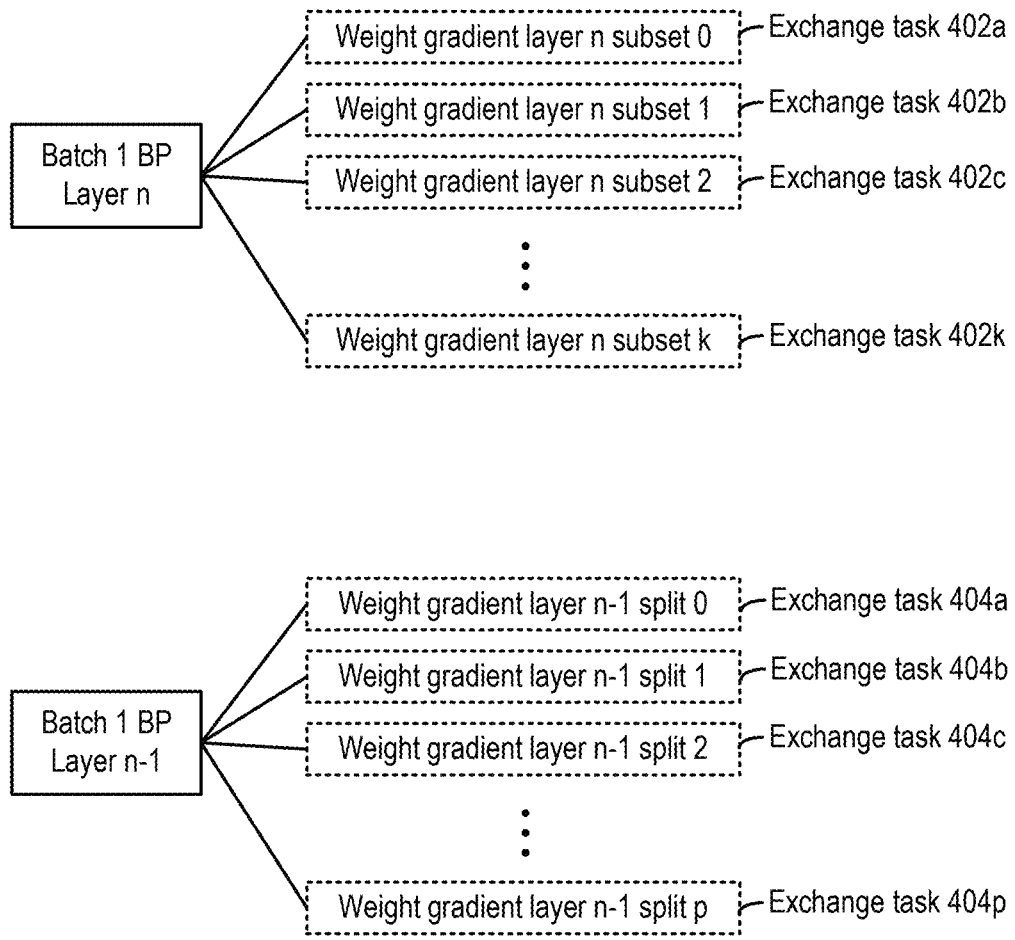
FIGS. 4A-4E illustrate examples of performing a training process of a neural network in a distributed system, according to certain aspects of the present disclosure.

FIG. 4A-FIG. 4E illustrates an example method of performing a training process in a distributed system to reduce the training time. As shown in FIG. 4A, the weight gradients of higher neural network layers, such as layers n and n−1, can be split into one or more subsets. Each subset can be associated with an exchange operation. For example, for layer n, the weight gradients can be split into subsets 0 to kn, each associated with an exchange task 402 (e.g., 402a, 402b, 402c, 402k, etc.). Moreover, for layer n−1, the weight gradients can be split into subsets 0 to kn−1, each associated with an exchange task 404 (e.g., 404a, 404b, 404p, etc.). Each exchange task can be executed to perform an exchange operation of the associated subset of weight gradients. Each subset can include a pre-determined number of weight gradients, which sets a total number of exchange operations required to complete the exchange of the weight gradients for a layer.

Figure 4B:
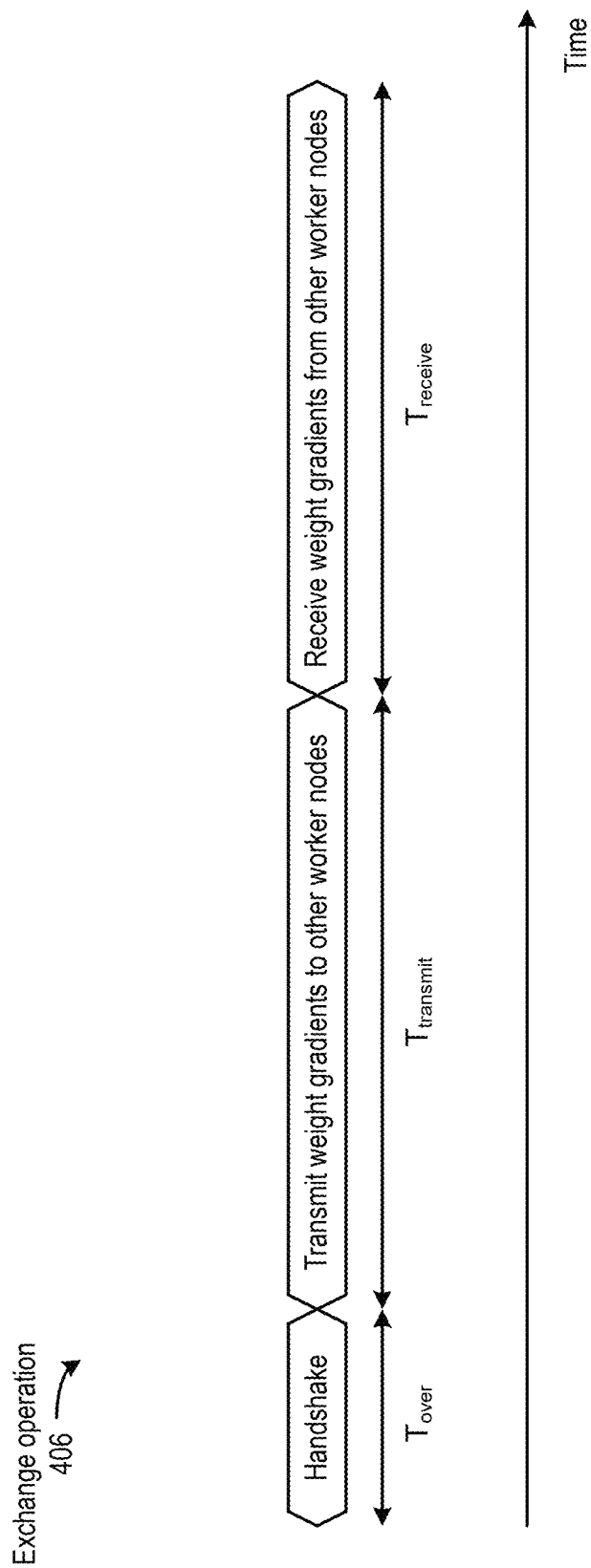

FIG. 4B illustrates an example of an exchange operation 406 with respect to time. As shown in FIG. 4B, the exchange operation can include multiple sub-operations. For example a worker node can perform a handshake with each of other worker nodes to establish a communication channel based on a network protocol (e.g., TCP/IP). The worker node can also perform other preparation sub-operations, such as reading a subset of weight gradients from a memory, storing the subset of weight gradients in a buffer of a network interface, packetizing the subset of weight gradients into network packets, etc. Via the communication channels, the worker node can transmit the subset of weight gradients generated locally for a layer to the other worker nodes as network packets and receive another subset of weight gradients from each of other worker node. The worker node can also perform processing of the received weight gradients, such as de-packetizing the network packets to extract the weight gradients, performing the averaging, and storing the averaged weight gradients back into the memory. After all the exchange tasks of the layer are complete, each worker node can have the averaged weight gradients for that layer and can then proceed to update the weights of that layer based on the averaged weight gradients.

The exchange of the subset of weight gradients over the network can be performed within a duration of exchange time $T_{exchange}$, whereas other sub-operations of the exchange operation (e.g., handshake, preparation of weight gradients for transmission, processing of received weight gradients, etc.) can be performed within a duration of overhead time $T_{overhead}$. The exchange time $T_{exchange}$ and the overhead time $T_{overhead}$ may be influenced by different aspects of the exchange operation. For example, the exchange time $T_{exchange}$ may vary with the number of weight gradients exchanged in the exchange operation, the network bandwidth, etc. Moreover, the overhead time $T_{overhead}$ may vary based on the amount of information exchanged during the handshake process, which may be defined based on the network protocol, as well as the computation resource available to perform the preparation for the transmission of weight gradients and the processing of the received weight gradients. The total of overhead time $T_{overhead}$ and exchange time $T_{exchange}$ can represent a total time of completion of an exchange operation.

Figure 4C:
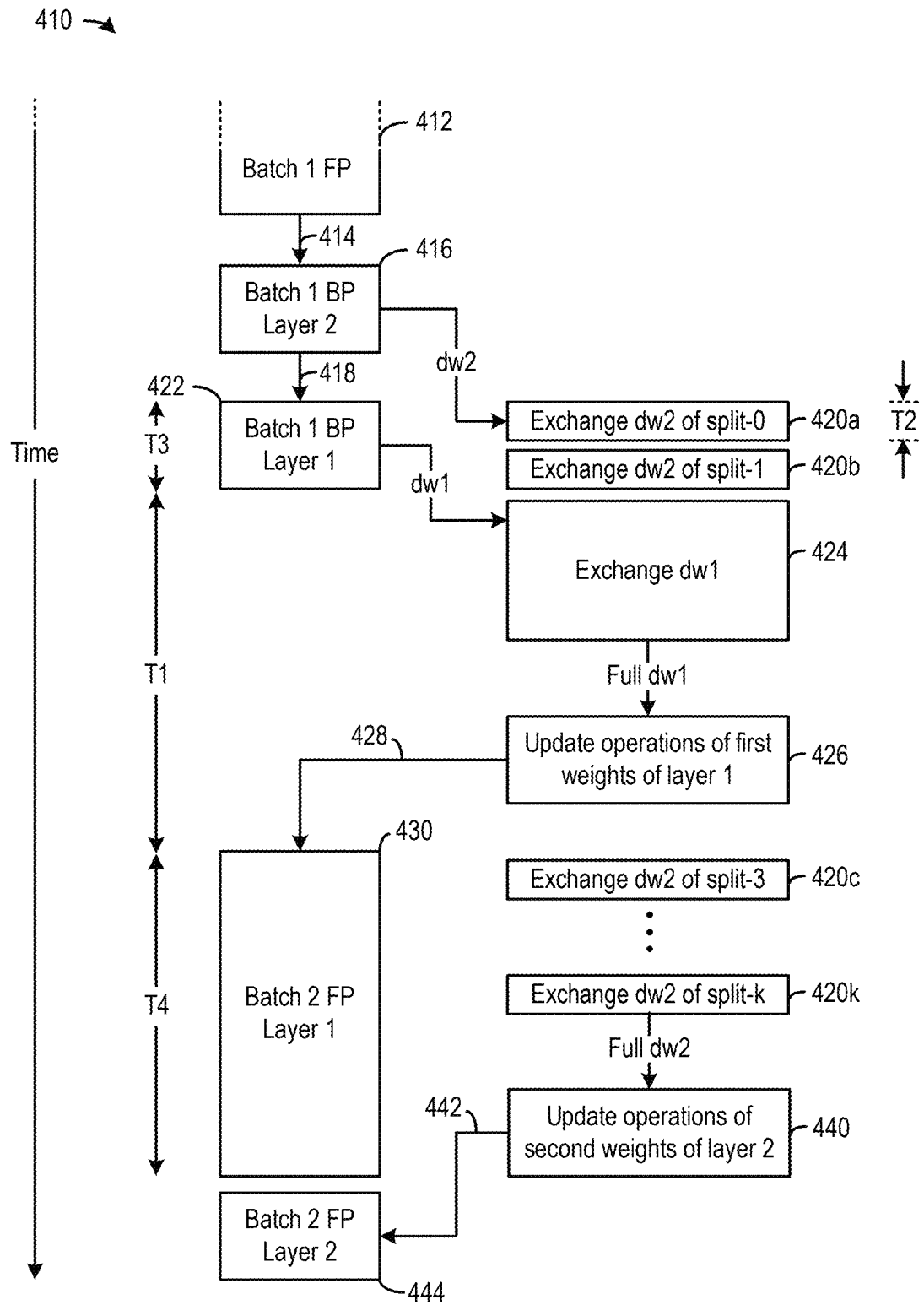

The splitting of the weight gradients into a plurality of exchange operations can facilitate the management of the exchange of the weight gradients to reduce the training time. FIG. 4C illustrates an example of a training operation 410 of a neural network including the exchange operations at a worker node. For simplicity of illustration, the neural network has only two layers. The second layer (layer 2) receives the output of the first layer (layer 1) as input. As shown in FIG. 4C, after the batch 1 forward propagation operations 412 complete and input data gradients 414 are generated, the worker node can perform batch 1 backward propagation operations 416 of the second layer based on input data gradients 414 to generate second weight gradients (dw2 in FIG. 4B) and second data gradients 418. The worker node can split the second weight gradients into subsets 0 to k, with each subset associated with an exchange task 420. For example, exchange task 420a can be associated with subset-0 of dw2, exchange task 420b can be associated with subset-1 of dw2, exchange task 420k can be associated with subset-k of dw2, etc. The worker node can then perform batch 1 backward propagation operations 422 of the first layer based on second data gradients 418. In parallel with backward propagation operations 422 of the first layer, the worker node can execute some of exchange tasks 420. For example, within the duration of backward propagation operations 422 of the first layer, the worker node can complete the execution of exchange tasks 420a and 420b to perform the exchange operations of subset-0 and subset-1 of second weight gradients dw2.

Following the completion of execution of exchange task 420b, backward propagation operations 422 of the first layer is complete, and first weight gradients dw1 are generated. The worker node can suspend the exchange operations of the second weight gradients and allow exchange operation 424 of the first weight gradients dw1 to proceed instead. In the example of FIG. 4B, as exchange operation 424 of first weight gradients dw1 is of the highest priority and is not suspended for other exchange operations, first weight gradients dw1 are not split and are exchanged in one exchange operation 424. As part of exchange operation 424, the worker node can exchange the first weight gradients dw1 with other worker nodes and performing averaging between the transmitted and received weight gradients to obtain averaged weight gradients for the first layer.

After exchange operation 424 of the first weight gradients dw1 is complete, the worker node now have the averaged weight gradients (labelled "averaged dw1") and can perform an update operation 426 to update first weights 428 of the first layer based on the averaged dw1. As batch 2 forward propagation operations 430 of the first layer follows immediately after update operation 426 and cannot start until first weights 428 are updated by update operation 426, prioritizing exchange operation 424 of the first weight gradients can reduce the stall time T1 between batch 1 backward propagation operations 422 and batch 2 forward propagation operations 430 of the first layer. The training time, which can span across multiple batches and iterations of forward and backward propagation operations, can be reduced as a result.

In parallel with or after update operation 426, the worker node can perform batch 2 forward propagation operations 430 of the first layer based on updated first weights 428. In parallel with batch 2 forward propagation operations 430 (and update operation 426), the worker node can execute some or all of the remaining exchange tasks 420 to perform exchange operations of the remaining subsets of second gradients dw2. In the example of FIG. 4B, the remaining exchange tasks 420 are completed, and update operation 440 of second weights 442 of the second layer based on the averaged dw2 are also completed, within the duration of batch 2 forward propagation operations 430 of the first layer. The worker node can then perform batch 2 forward propagation operations 444 based on updated second weights 442.

The training time of training process 410 can be reduced (or minimized) if exchange operations 420 of second weight gradients dw2 can be performed completely in parallel with backward and forward propagation operations of the first layer as well as the update operations of first weight of the first layer. The degree of parallelism can be determined by the time of completion of each exchange operation 420, as well as the times of completion of batch 1 backward propagation operations 422 and of batch 2 forward propagation operations 430 of the first layer. For example, in FIG. 4C, each exchange operation 420 can have a time of completion T2. Moreover, batch 1 backward propagation operations 422 of the first layer can have a time of completion T3, whereas weights update operations 426 and batch 2 forward propagation operations 430 of the first layer can have a total time of completion T4. In the illustrative example of FIG. 4C, the duration of T3 can be twice of T2, and two exchange operations 420 (420a and 420b) can be performed in parallel with batch 1 backward propagation operations 422 of the first layer and can be complete at the same time as backward propagation operations 422. As a result, exchange operation 424 of first weight gradients dw1 can start as soon as after the first weight gradients are generated (by backward propagation operations 422) with minimum stall time. Moreover, based on a relationship between T2 and T4, the remaining exchange operations 420 (420c, 420k, etc.) can also be performed in parallel with weights update operation 426 and batch 2 forward propagation operations 430. As a result, batch 2 forward propagation operations 444 of the second layer can start right after the forward propagation operations of the first layer with minimum stall time. The reduced stall times can minimize the training time of training process 410.

Multiple operation conditions can influence the time of completion T2 of the exchange operations 420, the time of completion T3 of batch 1 backward propagation operations 422, the time of completion T4 of batch 2 forward propagation operations 430, and the resulting degree of parallelism between the exchange operations and the backward and forward propagation operations. Specifically, T2 can vary based on the number of second weight gradients included in each exchange operation as well as the bandwidth of the computer network, as described above in FIG. 4B. Moreover, T3 and T4 can vary based on, for example, the size of the first layer, the computation bandwidth of the worker node, etc. Setting a fixed number of the second weight gradients in each exchange operation 420, irrespective of the characteristics of the computer network nor the characteristics of the neural network, can decrease the degree of parallelism between the exchange operations and the backward and forward propagation operations and increase the training time.

Figure 4D:
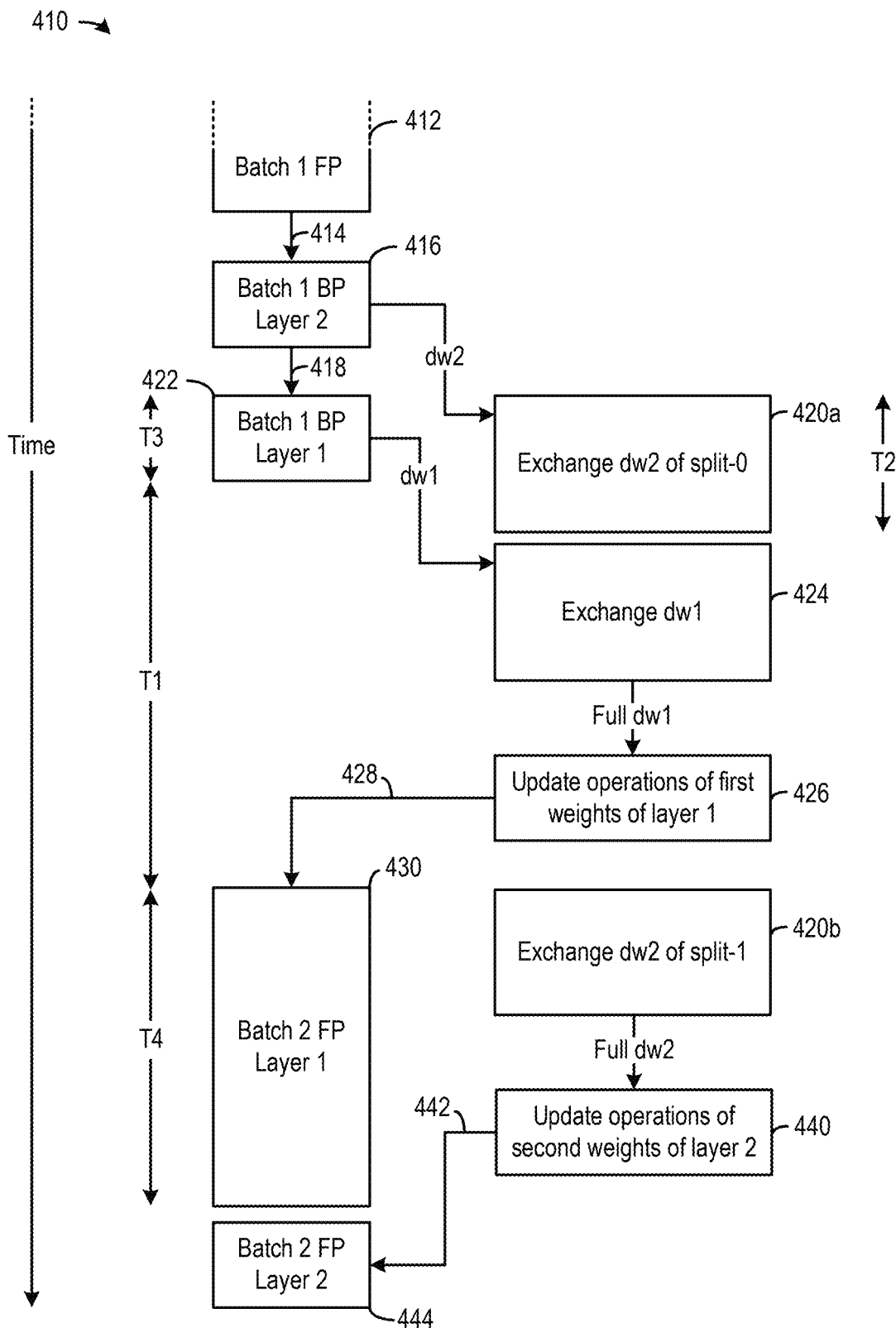
Figure 4E:
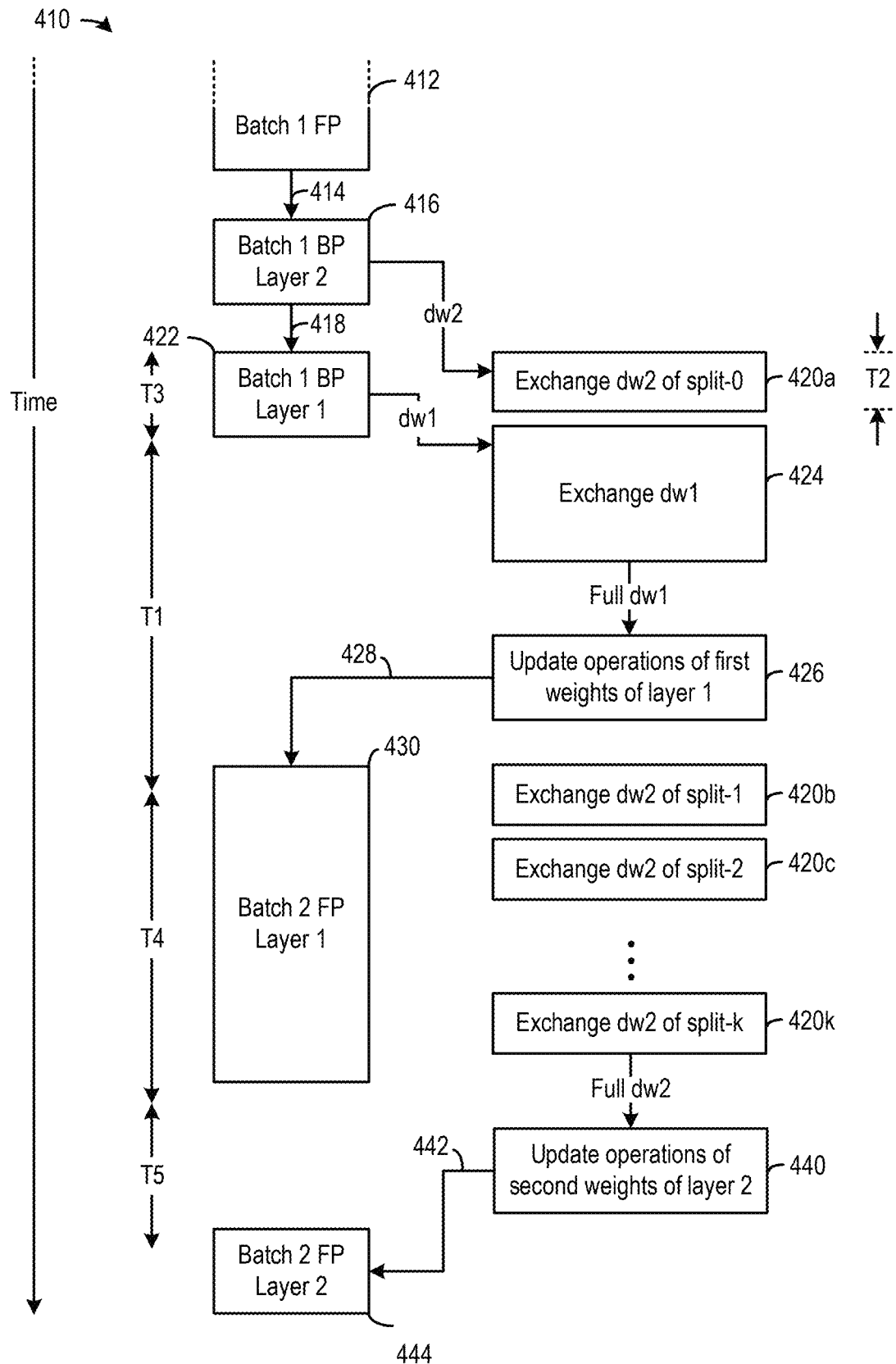

FIG. 4D and FIG. 4E illustrate examples where a particular choice of a number of weight gradients exchanged in an exchange operation can increase the training time with respect to FIG. 4C. In the example of FIG. 4D, a larger number of second weight gradients dw2 (e.g., relative to the size of layer 1) is included in each exchange operation 420, which is split into only two exchange operations 420a and 420b. Due to the larger number of second weight gradients dw2 exchanged in each exchange operation, the time of completion T2 becomes longer than the time of completion T3 of batch 1 backward propagation operations 422 of the first layer. As a result, exchange operation 420a extends beyond the backward propagation operations, and exchange operation 424 of the first weight gradients dw1 needs to stall and cannot start right away after the first weight gradients are generated. The additional stall time of exchange operation 424 increases the stall time T1 between batch 1 backward propagation operations 422 and batch 2 forward propagation operations 430 of the first layer, and increases the training time.

FIG. 4E illustrates another example where a particular choice of a number of weight gradients exchanged in an exchange operation can increase the training time. In the example of FIG. 4E, the second weight gradients dw2 are split into subsets 0 to k as in FIG. 4C. But due to lower network bandwidth, the time of completion T2 of each exchange operation can become longer than as shown in FIG. 4C. In the example of FIG. 4E, one exchange operation 420a can be performed in parallel with batch 1 backward propagation operations 422 of the first layer, while the remaining exchange operations 420 (e.g., exchange operation 420b, 420k, etc.) are performed after exchange operation 424 of the first weight gradients dw1. There are k number of remaining exchange operations 420 to be performed, following update operations 440 of second weights 442 of the second layer. Due to the accumulation of overhead time, the k remaining exchange operations 420 take a longer time to complete than the total time of update operations 426 and batch 2 forward propagation operations 430 of the first layer. As a result, after batch 2 forward propagation operations 430 of the first layer are complete, batch 2 forward propagation operations 444 of the second layer, which need the updated second weights 442 from update operations 440, need to be put on hold for a stall time of T5 to wait for the k remaining exchange operations 420 and update operations 440 to complete. The stall time T5 can be significant and can increase the training time.

In the examples of FIG. 4D and FIG. 4E, it can be seen that the number of the second weight gradients included in each exchange operation 420 can be adapted to the various operation conditions of the training process to reduce the training time. For example, in FIG. 4D, the training time may be reduced if a smaller number of the second weight gradients is included in each exchange operation 420, which allows fewer second weight gradients to be exchanged in parallel with batch 1 backward propagation operations 422 and more second weight gradients to be exchanged in parallel with batch 2 forward propagation operations 430, to maximize the parallelism between the exchange operations and the forward/backward propagation operations. Moreover, in FIG. 4E, the training time may be reduced if a larger number of the second weight gradients is included in each exchange operation 420. Such arrangements can reduce the number of exchange operations 420, which in turn can increase the share of time when the network is used in transmitting the weight gradients versus, for example, the transmission of handshake information, and the network efficiency in transmitting the second weight gradients of the computer network by each worker node can be improved. The total time of the exchange operations of the second weight gradients can also be reduced as a result. Although such arrangements may introduce delay to exchange operation 424 and update operation 426 of first weight gradients dw1, the increase can be compensated by the reduction in the number of exchange operations 420 to be performed after exchange operation 424 and update operation 426 of first weight gradients dw1. The stall time of batch 2 forward propagation operations 444 of the second layer can be reduced as a result, which can also reduce the training time.

Moreover, in a case where the neural network comprises multiple higher layers of small sizes, it may also be advantageous to merge the exchange operations of weight gradients for those higher layers to reduce the number of exchange operations for similar reasons as described above with respect to FIG. 4E. Specifically, if those layers only generate small number of weight gradients, dividing them into separate exchange operations may incur huge amount of overhead time, which can reduce the network efficiency of transmitting the weight gradients. This is especially the case when the number of weight gradients generated by a layer is so small that it is below a heuristic size to maintain a threshold network transmission efficiency of the weight gradients, which can be related to a topology of the computer network, a packet size supported by the computer network, etc. The network efficiency of transmitting the weight gradients, as well as the training time, can be improved by merging the exchange operations of weight gradients of those higher layers. For example, each exchange operation can include weight gradients from different layers, and a larger number of weight gradients can be included in each exchange operation, to reduce the number of exchange operations.

As discussed above with respect to FIG. 4A-FIG. 4E, a particular choice of a number of weight gradients included in an exchange operation for a neural network layer can lead to reduction or even minimization of the training time. FIG.

Figure 5A:
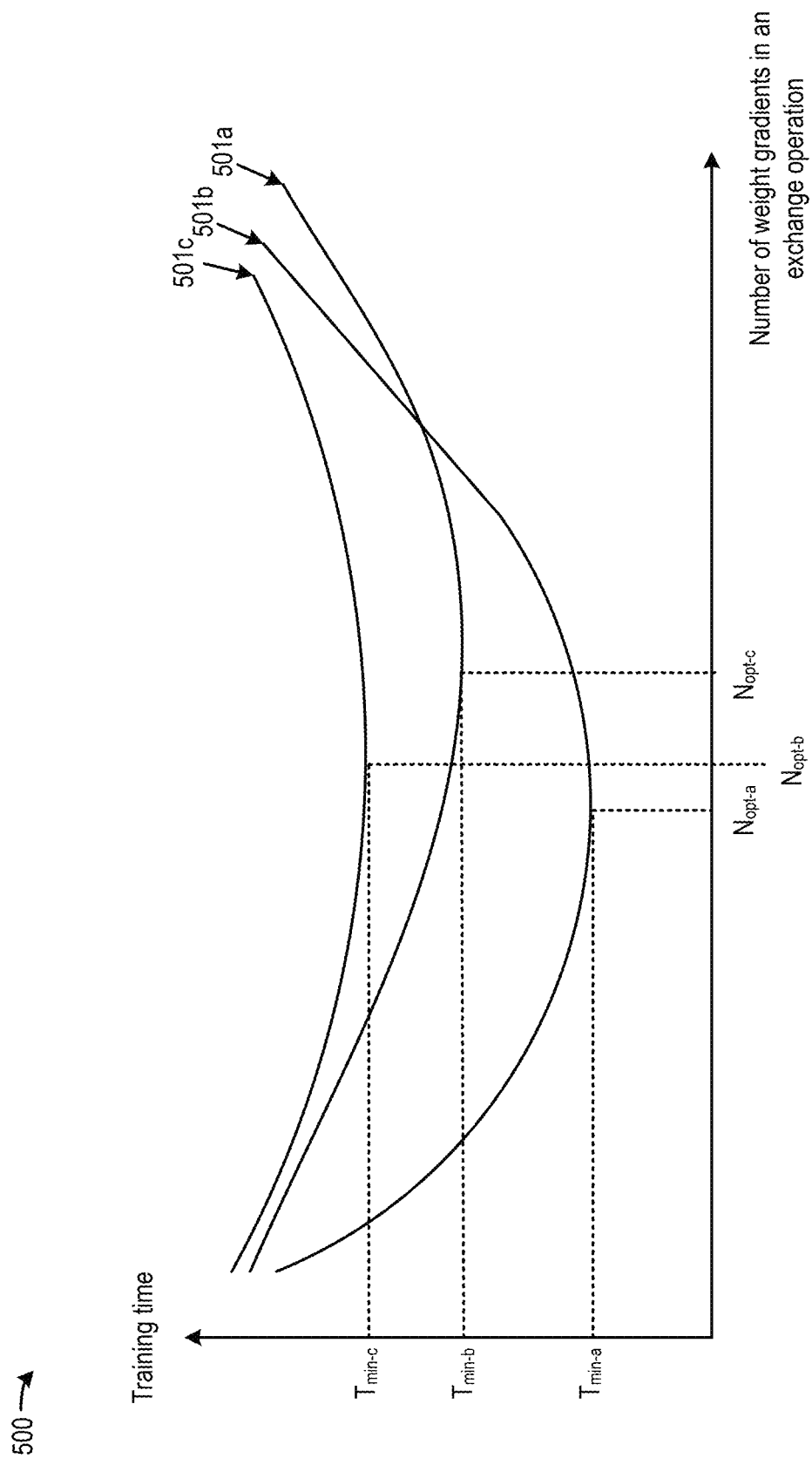
FIGS. 5A-5C illustrate examples of a computing system to reduce the completion time of the example training processes of FIGS. 4A-4E.

5A illustrates a plot 500, which include graphs 501a, 501b, and 501c that illustrate relationships between the training time and the number of weight gradients for different neural networks and for computer networks having different characteristics (e.g., different network bandwidths). As shown in FIG. 5A, a minimum training time $T_{min}$ can be achieved when an optimal number of weight gradients, labelled $N_{opt}$, is included in each exchange operation for all layers (including exchange operations that merge two or more layers). Different combinations of neural network and computer network characteristics can have different pairing of $T_{min}$ and $N_{opt}$, such as $T_{min-a}$ and $N_{opt-a}$ for graph 501a, $T_{min-b}$ and $N_{opt-b}$ for graph 501b, and $T_{min-c}$ and $N_{opt-c}$ for graph 501c. The number of weight gradients $N_{opt}$ for a layer (or combinations of $N_{opt}$'s for different layers) can represent a scenario where the parallelism between the exchange operations and the forward and backward propagation operations is maximized, based on a trade-off between the benefits and penalties of dividing the weight gradients into a number $N_{min}$ of exchange operations for a particular set of computer network and neural network characteristics.

In some examples, the optimal number of weight gradients of weight gradients included in an exchange operation for each layer of a neural network, and whether or not to merge the exchange operations across multiple layers, can be indicated in a profile configuration. The profile configuration can indicate, for a given set of characteristics of a neural network (e.g., the topology of the neural network, the sizes and connectivity of each layer of the neural network, etc.), and for a given set of characteristics of the computer network (e.g., a bandwidth of the computer network, a topology of the computer network, a packet size of the computer network, a threshold transmission efficiency of the computer network, etc.), the optimal number of weight gradients included in an exchange operation for each layer of a neural network that can minimize the training time. The profile configuration can also indicate whether or not to merge the exchange operations across multiple layers, and the number of weight gradients from the multiple layers to be included in each exchange operation, to minimize the training time. Multiple profile configurations for different combinations of characteristics of neural networks and computer networks can be provided. A profile configuration having the matching neural network and computer network characteristics can be selected, and a training process can be configured based on the selected profile configuration.

Figure 5B:
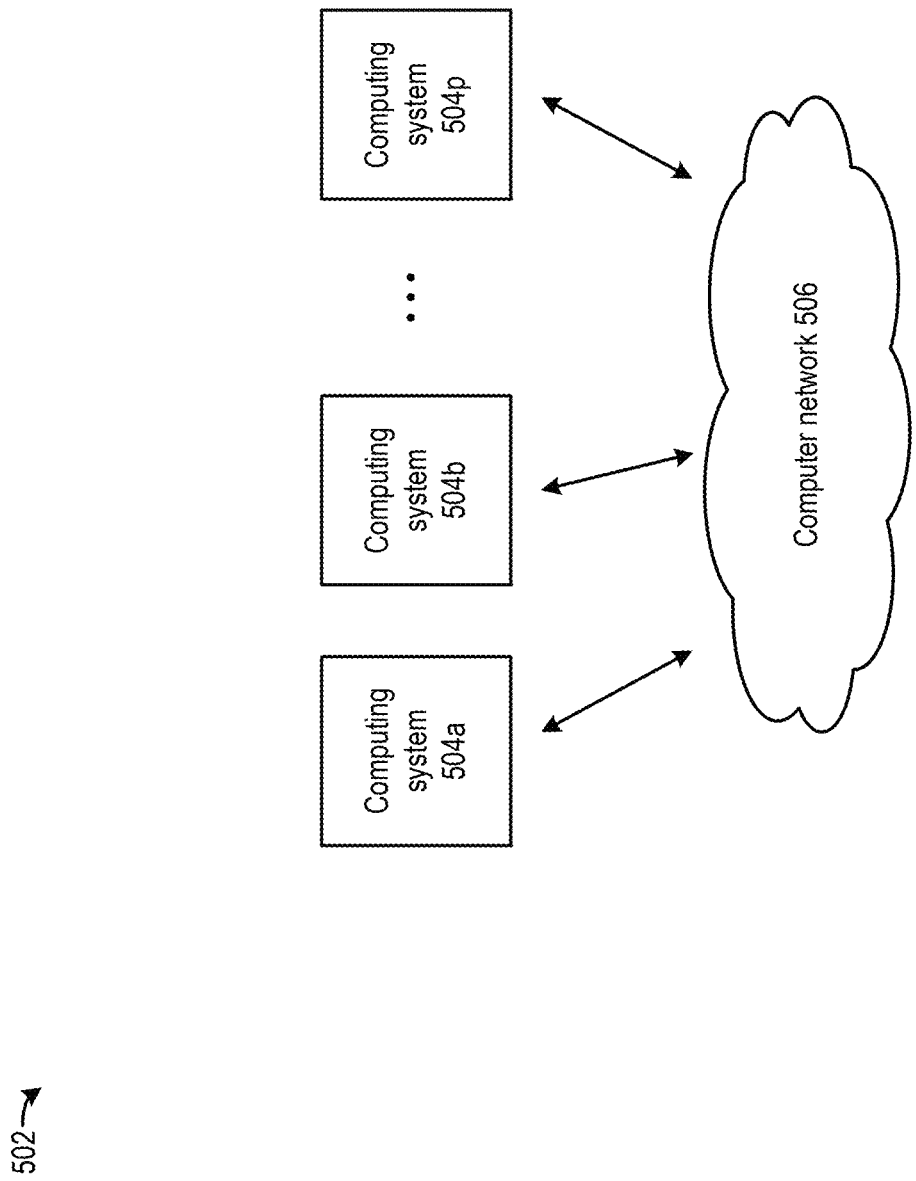

FIG. 5B illustrate a distributed system 502 that can perform a training process for a neural network and generate a profile configuration indicating an optimal number of weight gradients included in the exchange operations to minimize the overall completion time of the training process. As shown in FIG. 5B, distributed system 502 includes a plurality of computing systems 504a, 504b, 504p, etc. Each computing system can include a hardware interface to communicate with each other via a computer network 506. Each computing system can represent a worker node and include computing resources to perform the operations of a training process in FIGS. 4C-4E including forward propagation operations 430 and 444, backward propagation operations 416 and 422, update weights operations 426 and 440, etc. The computing resources may include, for example, a neural network hardware accelerator, a general purpose hardware processor, or other suitable computing systems that support the arithmetic operations involved in the training process. Each computing system can communicate, via computer network 506, with other computing systems to exchange weight gradients to perform exchange operations 420 and 424, and perform update weights operations 426 and 440 after the exchange operations are completed.

Figure 5C:
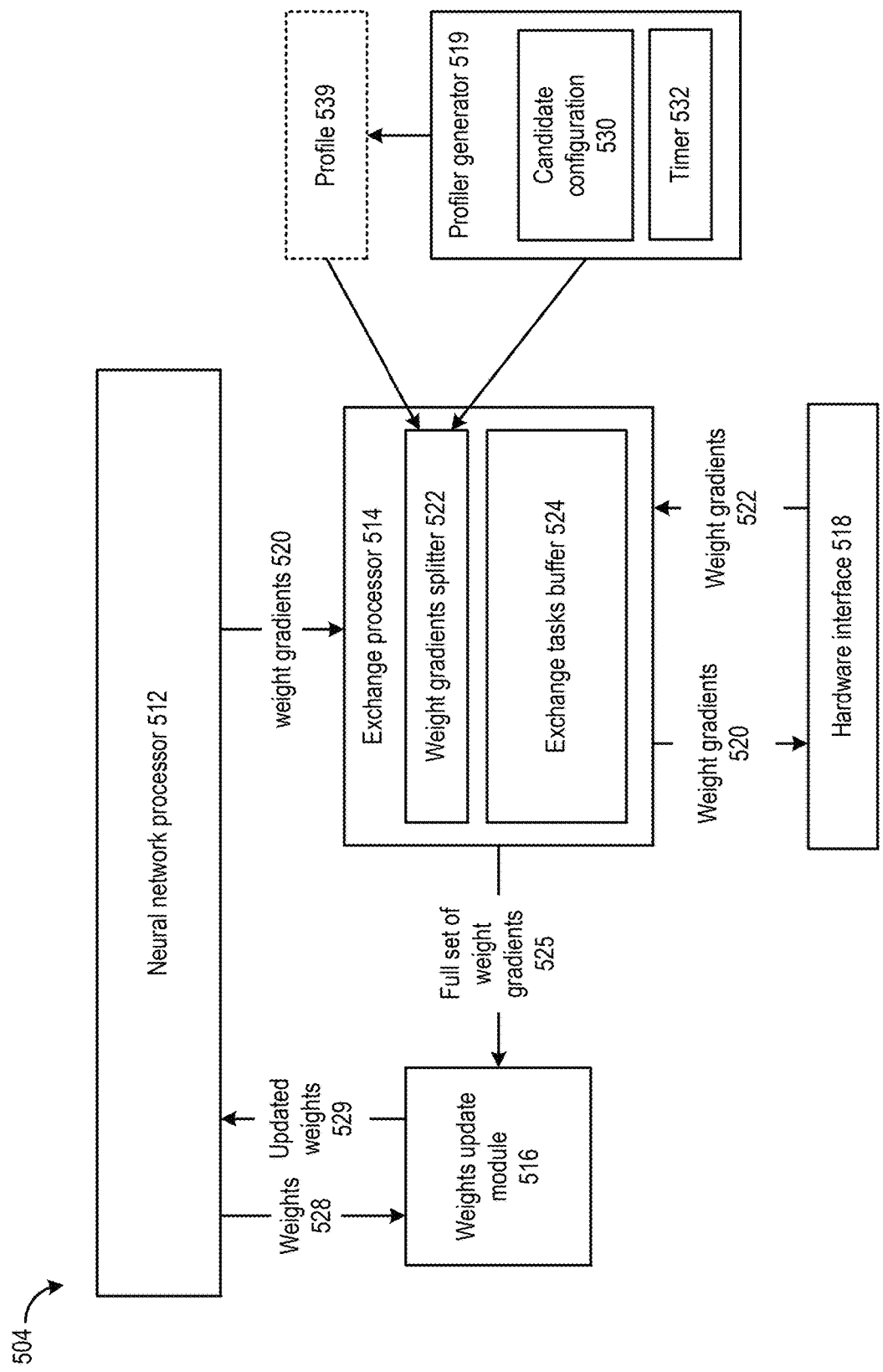

FIG. 5C illustrates an example of internal components of computing system 504. As shown in FIG. 5C, computing system 504 includes a neural network processor 512, an exchange processor 514, a weights update module 516, a hardware interface 518, and a profile configuration generator 519. In some examples, exchange processor 514, weights update module 516, and profile configurations generator 519 can be implemented in software. In some examples, exchange processor 514, weights update module 516, and profile configuration generator 519 can also be implemented as hardware components, such as being part of an application specific integrated circuit (ASIC), a field programmable gate arrays (FPGA) device, etc. Computing system 502 further includes a controller (not shown in FIG. 5C) to coordinate the operations among neural network processor 512, exchange processor 514, weights update module 516, hardware interface 518, and profile configuration generator 519.

Neural network processor 512 can perform forward propagation operations 412 and 444, as well as backward propagation operations 416 and 422 of FIGS. 4C-4E. After neural network processor 512 generates weight gradients for one neural network layer (e.g., weight gradients 520), it sends the weight gradients to exchange processor 514, which manages the exchange operation of the weight gradients. As part of the exchange operation, exchange processor 514 can forward the weight gradients to hardware interface 518 for transmission to other worker nodes via computer network 506. Exchange processor 514 can also receive other weight gradients (e.g., weight gradients 522) from other worker nodes via computer network 506 and hardware interface 518. Exchange processor 514 can average weight gradients 520 and 522 to generate averaged weight gradients 525 for a neural network layer, and then transfer averaged weight gradients 525 to weights update module 516.

Weights update module 516 can perform weights update operations 426 (for first weights of the first layer) and weights update operations 440 (for second weights of the second layer). Weights update module 516 can include software instructions and/or hardware circuits (e.g., arithmetic circuits) to update weights based on Equation 4 above. As part of the weights update operations, weights update module 516 can receive weights 528 for that neural network layer from neural network processor 512 (or from other sources), update the weights based on the averaged weight gradients 525 from exchange processor 514 according to Equation 4 above, and send updated weights 529 to neural network processor 512 prior to next batch of forward propagation operations 430 and 444. Meanwhile, during the exchange of the weight gradients and updating of the weights, neural network processor 512 can start the backward propagation operation for the next (lower) neural network layer. Neural network processor 512 can then send weight gradients for the next neural network layer to exchange processor 514 after the backward propagation operations for the next neural network layer complete.

Exchange processor 514 includes a weight gradients splitter 522 and an exchange tasks buffer 524. Weight gradients splitter 522 can split weight gradients 520 into one or more subsets, with each subset including a pre-configured number of weight gradients. As to be discussed below, the number of weight gradients can be configured by profile configuration generator 519, or configured based on a profile configuration 539 which can be generated by profile configuration generator 519. Each subset of weight gradients can be associated with an exchange task, which can be stored in exchange tasks buffer 524. Exchange tasks buffer 524 can be implemented in a memory that is coupled with or is part of exchange processor 514. Exchange tasks buffer 524 can be controlled to release the stored exchange tasks to hardware interface 518 for execution to perform exchange operations (e.g., exchange operations 420 and 424). To perform an exchange operation, hardware interface 518 can establish a communication channel with each of the other worker nodes, exchange weight gradients with each of the other worker nodes using the communication channels, and forward the received weight gradients back to exchange processor 514. Exchange tasks buffer 524 can be controlled to release the exchange tasks based on an order that prioritizes lower layers. For example, as described above in FIGS. 4C-4E, exchange tasks buffer 524 can release an exchange task for the second layer to perform an exchange operation 420 (e.g., 420a) for the second weight gradients after the second weight gradients are generated. After exchange operation 420a is complete, if the first weight gradients of the first layer are generated, exchange tasks buffer 524 can be controlled to release the exchange task(s) for the first weight gradients, and then resume releasing the remaining exchange tasks for the remaining second weight gradients after the exchange operations for the first weight gradients complete.

Profile configuration generator 519 can control neural network processor 512, exchange processor 514, and weights update module 516 to perform multiple iterations of a training process, such as training process 410, to determine an optimal number of weight gradients ($N_{opt}$) included in each exchange operation for each neural network layer. Profile configuration generator 519 may generate a candidate configuration 530 each iteration. Each candidate configuration 530 can set a candidate number of weight gradients in each exchange operation of each layer, and may specify that the exchange operations of multiple layers are to be merged. In some examples, the candidate numbers of weight gradients can be identical for all layers of a neural network in a profile configuration. In some examples, a profile configuration may specify different candidate numbers of weight gradients for at least two layers of the neural network.

Profile configuration generator 519 can employ various techniques to set the candidate numbers of weight gradients in the candidate profile configurations. In some examples, the candidate numbers can be based on scaling from a start value, random functions (e.g., based on a Gaussian distribution around the start value), etc. The start value can be based on, for example, a common parameter of a computer network. For example, a computer network may require a minimum number of weight gradients in an exchange operation to maintain a minimum threshold of transmission efficiency, and the candidate numbers can be based on the minimum threshold. In a case where the number of weight gradients generated by a layer is lower than the minimum threshold, the exchange operations of that layer can be merged with other layers to reduce the overhead, as described above. The selection of the layers to merge the exchange operations, as well as the candidate number of weight elements included in the merged exchange operations, can become part of the candidate configurations.

Profile configuration generator 519 (or the controller) can control neural network processor 512 to perform multiple iterations of a training process. The training process can be based a subset of the training data involved in a full training operation that updates the weights for future inferencing operations. For each iteration of the training process, profile configuration generator 519 can supply a candidate configuration 530 to weight gradients splitter 522 to split the weight gradients for a neural network layer into subsets, with each subset including a candidate number of weight gradients for an exchange operation for each neural network layer as specified in the candidate configuration 530. Exchange processor 514 can then control hardware interface 518 to perform the exchange operations. Exchange processor 514 further includes a timer 532 to measure a time of completion of the iteration of the training process for each candidate configuration, to obtain a relationship between training time and the candidate numbers of weight gradients similar to those shown in FIG. 5A. Based on the relationship, profile configurations generator 519 can identify the candidate configuration that gives the minimum time of completion as a profile, such as profile configuration 539, for the neural network and for the computer network. Other profile configurations can be generated for other neural networks in other distributed systems having computer networks of different characteristics. Each profile configuration can be stored in a database and associated with first characteristics of the computer network (e.g., a topology of the computer network, threshold network efficiency in transmitting the weight gradients, overhead time, etc.) and second characteristics of the neural network (e.g., a topology of the neural network, a number of weight gradients to be exchanged for each layer of the neural network, etc.).

After the profile configurations are generated, a profile configuration 539 can be selected by distributed system 502 for a second training process. The second training process can be a full training process to update the weights of each layer of the neural network for future inferencing operations. The second training process can be based on a full set of training data. Profile configuration 539 can be selected based on the neural network to be trained, as well as computer network 506, matching those associated with profile configuration 539. Weight gradients splitter 522 of each computing system 504 can then be configured based on profile configuration 539 to set the number of weights included in each exchange operation/task for each neural network, and to merge the exchange operations of some layers if profile configuration 539 indicates such.

Figure 6A:
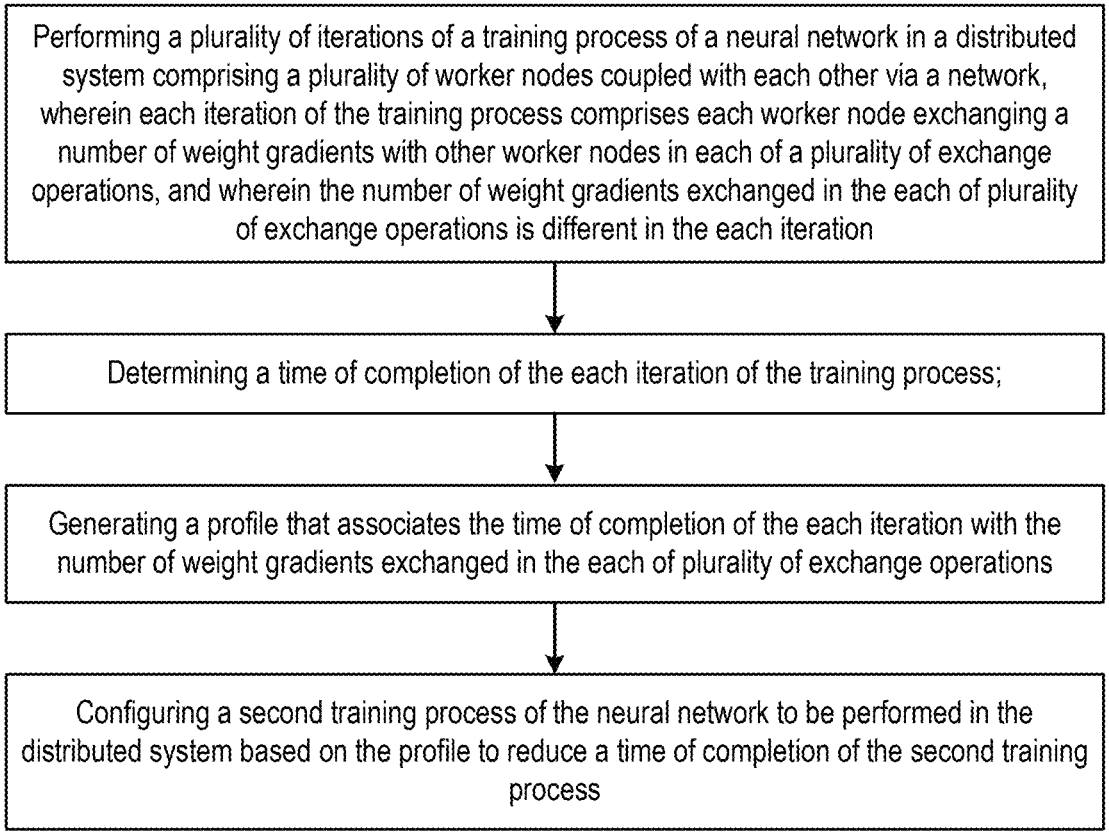
FIG. 6A and FIG. 6B illustrate example methods of performing a training process of a neural network in a distributed system, according to certain aspects of the present disclosure.

FIG. 6A illustrates an example method 600 of determining a profile configuration for a training process of a neural network over a distributed computing system, such as distributed system 500. Distributed system 500 includes a plurality of computing systems 504 configured as worker nodes connected over computer network 506. As described above, the training process can be performed on a set of input data. The set of input data can be divided into a plurality of portions. Each portion is then divided into sub-portions. Each worker node can perform the training process a sub-portion of the input data in a first batch, followed by another sub-portion in a second batch, until all sub-portions of the input data have been used Each batch of the training process can be performed by a neural network hardware and can include forward propagation operations for each layer followed by backward propagation operations for each layer, to generate weight gradients for each layer. Each worker node can exchange the weight gradients generated for each layer with other worker nodes, perform averaging on the exchanged weight gradients to generate averaged weight gradients, and update the weights for each layer based on the exchanged weight gradients. The weight gradients for each layer can be split into multiple subsets associated with multiple exchange operations.

As described in FIG. 4C-FIG. 4D, the exchange operations can be performed in parallel with the forward and backward propagation operations, with the exchange operations for lower layers prioritized over those for higher layers, to reduce the overall training time. The number of exchange operations for each layer, which depends on a number weight gradients included in the exchange operations, can be determined based on a trade-off between the benefits and penalties of dividing the weight gradients into that number exchange operations for a particular set of computer network and neural network characteristics. For example, referring back to FIG. 4D, including a larger number of weight gradients in an exchange operation (and reducing the number of exchange operations) for a higher layer may improve network efficiency in transmitting the weight gradients by reducing the accumulative overhead time, but such arrangements may introduce additional delay to the exchange operation of a lower layer especially for a neural network topology in which the lower layer is small and the backward propagation operations of the lower layer can be completed in a short time. On the other hand, referring back to FIG. 4E, including a smaller number of weight gradients in an exchange operation (and increasing the number of exchange operations) for a higher layer may reduce the delay to the exchange operation of a lower layer, but such arrangements increase the accumulative overhead time, which may substantially degrade the overall network efficiency in transmitting the weight gradients, especially in a computer network that incurs huge handshake time. A profile configuration can be determined which can indicate the number of weight gradients to be included in an exchange operation for each neural network layer, and whether the exchange operation should be merged for two or more neural network layers, which represent an optimum trade-off between the aforementioned benefits and penalties of splitting the weight gradients into multiple exchange operations and can lead to a reduced or minimum training time.

Method 600 starts with step 602, in which each worker node in distributed system 502 performs a plurality of iterations of a first training process of a neural network. Each iteration of the first training process is performed based on a candidate profile configuration associated with first characteristics of computer network 506 of distributed system 500 (e.g., a topology of the computer network, threshold network efficiency in transmitting the weight gradients, overhead time, etc.) as well as second characteristics of the neural network (e.g., a topology of the neural network, a number of weight gradients to be exchanged for each layer of the neural network, etc.). The candidate profile configuration for each iteration can specify a candidate number of weight gradients to be exchanged in each of one or more exchange operations for each layer of the neural network in the each iteration. Moreover, the candidate profile configurations for different iterations specify different candidate numbers of weight gradients for a layer of the neural network.

In some examples, the first training process can receive a subset of training data for a full training operation. In each iteration of the training process, each worker node exchanges a number of weight gradients with other worker nodes in each of one or more exchange operations for each layer of the neural network based on the candidate profile configuration for that iteration. The candidate profile configuration may specify the candidate number of weight gradients to be included in an exchange operation for each layer, and whether the exchange operation should be merged for two or more layers. In some examples, a candidate profile configuration may specify a same candidate number of weight gradients is exchanged in an exchange operation for all layers, but the candidate number is different for different iterations. In some examples, a candidate profile configuration may specify different candidate numbers of weight gradients for at least some layers of the neural network layer, and different candidate profile configurations specify different combinations of candidate numbers for those layers.

Various techniques are proposed to set the candidate numbers of weight gradients in the candidate profile configurations. In some examples, the candidate numbers can be based on scaling from a start value, random functions (e.g., based on a Gaussian distribution around the start value), etc. The start value can be based on, for example, a common parameter of a computer network. For example, a computer network may require a minimum number of weight gradients in an exchange operation to maintain a minimum threshold of transmission efficiency, and the candidate numbers can be based on the minimum threshold. In a case where the number of weight gradients generated by a layer is lower than the minimum threshold, the exchange operations of that layer can be merged with other layers to reduce the overhead, as described above. The selection of the layers to merge the exchange operations, as well as the candidate number of weight elements included in the merged exchange operations, can become part of the candidate profile configurations.

A profile configuration generator 519 of the worker node can control neural network processor 512 to perform multiple iterations of the first training process. For each iteration of the first training process, profile configuration generator 519 can supply a candidate configuration 530 to weight gradients splitter 522 to split the weight gradients for a neural network layer into subsets, with each subset including a candidate number of weight gradients for an exchange operation for each neural network layer as specified in the candidate configuration 530. Exchange processor 514 can then control hardware interface 518 to perform the exchange operations.

In step 604, the worker node determines a time of completion of the each of the plurality of iterations of the first training process. The determination can be made by a timer (e.g., timer 532), and the measured time of completion includes the time of completion of the exchange operations.

In step 606, the worker node (e.g., profile configuration generator 519) can determine a profile configuration (e.g., profile configuration 539) for the neural network and for the computer network based on the time of completion determined in step 604. For example, profile configuration generator 519 can determine a relationship between each candidate profile configuration (e.g., represented by the candidate numbers of weight gradients in the exchange operations for each layer) and the time of completion of an iteration of the first training process performed based on that candidate profile configuration. The candidate profile configuration which gives the minimum time of completion (e.g., $N_{opt-a}$, $N_{opt-b}$, $N_{opt-c}$, etc. of FIG. 5A) can be selected as the profile configuration.

In step 608, the worker node (or other worker node) can perform a second training process of the neural network in the distributed system based on the profile configuration determined in step 606. The second training process can be a full training operation that updates the weights for future inferencing operations and receive the full set of training data as input. The worker node (or another worker node) can acquire the profile configuration based on the first characters of the computer network of the distributed system and the second characteristics of the neural network.

Figure 6B:
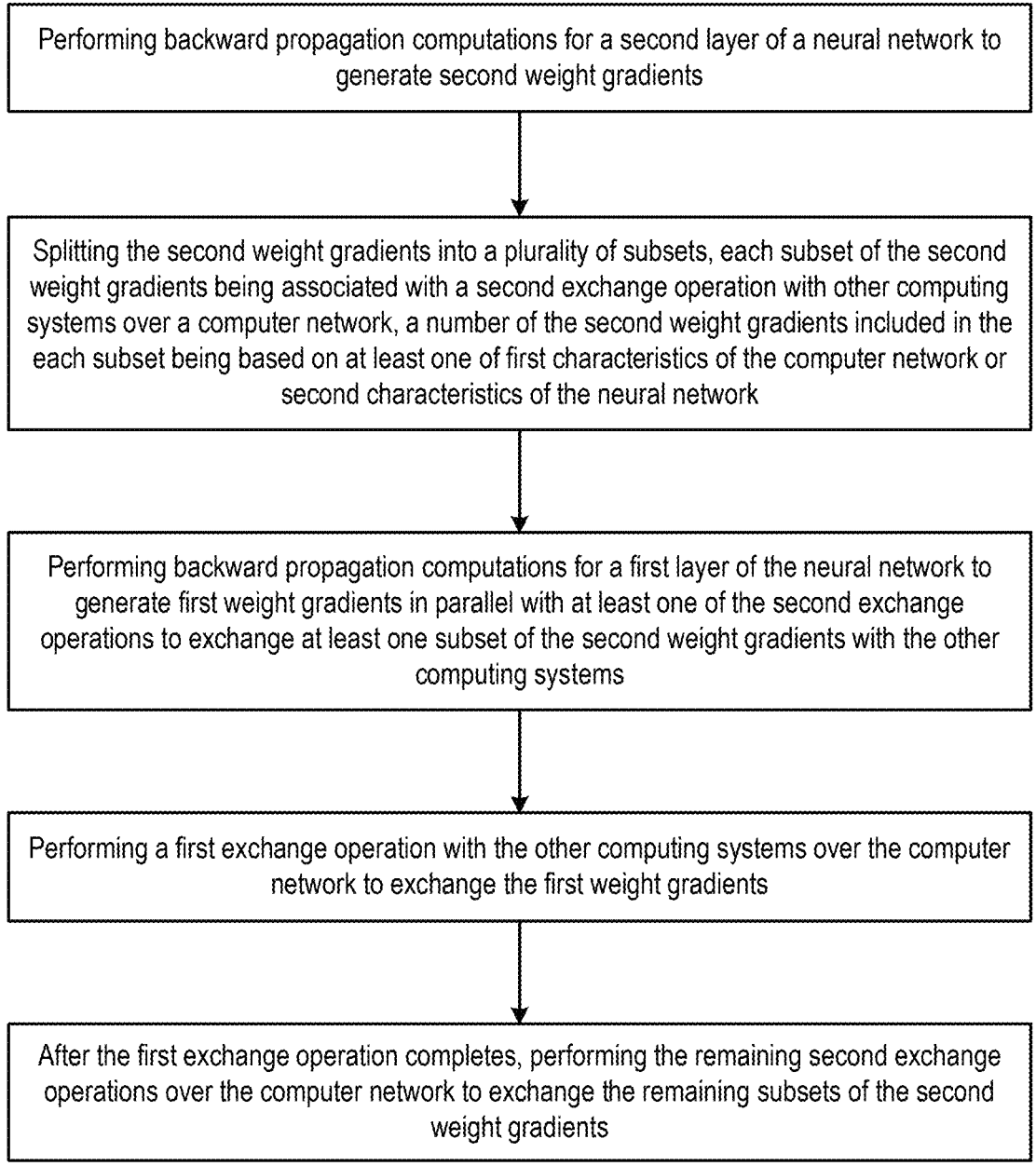

FIG. 6B illustrates an example method 650 of performing a training process of a neural network in a distributed system, such as distributed system 500. The training process can be the second training process of FIG. 6A and based on the full set of training data as input. The set of input data can be divided into a plurality of portions. Each portion is then divided into sub-portions. Each worker node can perform the training process a sub-portion of the input data in a first batch, followed by another sub-portion in a second batch, until all sub-portions of the input data have been used Each batch of the training process can be performed by a neural network hardware accelerator and can include forward propagation operations for each layer followed by backward propagation operations for each layer. In the example of FIG. 6B, the neural network may include multiple neural network layers including a first layer and a second layer. The second layer receives the output of the first layer as input.

Method 650 starts in step 652, in which the neural network processor of a first worker node of distributed system 500 performs backward propagation computations for the second layer to generate second weight gradients. The backward propagation computations can be of a first batch. Step 652 can be performed after the first batch forward propagation operations of both the first neural network layer and the second neural network layer have been completed, and input data gradients (din of FIG. 3A) has been generated. The first batch backward propagation computations can be performed based on either the input data gradients, or data gradients output by a higher neural network layer (if the neural network has more than two neural network layers).

In step 654, the first worker node splits the second weight gradients into a plurality of subsets, each subset of the second weight gradients being associated with a second exchange operation with other computing systems over a computer network. A number of the second weight gradients included in the each subset being based on at least one of first characteristics of the computer network or second characteristics of the neural network. As described above, the first worker node can obtain a profile configuration based on, for example, first characteristics of computer network 506 of distributed system 500 (e.g., a topology of the computer network, threshold network efficiency in transmitting the weight gradients, overhead time, etc.) as well as second characteristics of the neural network (e.g., a topology of the neural network, a number of weight gradients to be exchanged for each layer of the neural network, etc.). The profile configuration can specify, for example, a number of weight gradients to be included in an exchange task for the first layer and for the second layer that minimizes the training time. The number of weight gradients in the exchange task for the first layer and for the second layer can be the same or different. The second exchange operations can be stored as tasks in exchange tasks buffer 524.

In step 656, the first worker node performs backward propagation computations for the first layer to generate first weight gradients, the backward propagation computations for the first layer being performed in parallel with at least one of the second exchange operations to exchange at least one subset of the second weight gradients with the other computing systems. Each second exchange operation may include the first worker node transmitting a subset of the second weight gradients to each of other worker nodes of distributed system 500, receiving second weight gradients from each of other worker nodes, and performing averaging between the transmitted and received second weight gradients to determine averaged second weight gradients.

Specifically, after the first batch backward propagation operations of the second layer complete, the neural network hardware accelerator can perform the backward propagation computations of the first layer, while an exchange processor (e.g., exchange processor 514) can retrieve the second exchange tasks from exchange tasks buffer 524 and execute the second exchange tasks to perform the second exchange operations. The second exchange operations can be performed in parallel with the backward propagation computations of the first layer. Depending on the time of completion of each second exchange operation, multiple second exchange operations can be completed before the first batch backward propagation operations of the second layer complete.

In step 658, the first worker node performs a first exchange operation with the other computing systems over the computer network to exchange the first weight gradients after the at least one of the second exchange operations complete. The first exchange operation can be prioritized over the second exchange operations. When the task of the first exchange operation is stored in exchange tasks buffer 524, exchange processor 514 can complete the second exchange operation in progress. After the second exchange operation completes, exchange processor 514 can suspend the execution of the remaining second exchange tasks, retrieve the first exchange task from exchange tasks buffer 524, and execute the first exchange task to perform the first exchange operation. The number of first weight gradients included in the first exchange operation can be based on the profile configuration as well.

In step 660, the first worker node performs the remaining second exchange operations with the other computing systems over the computer network to exchange the remaining subsets of the second weight gradients. The remaining second exchange operations can be performed in parallel with the updating of the weights for the first layer as well as the forward propagation computations of the first layer, as shown in FIG. 4C-FIG. 4E.

Figure 7:
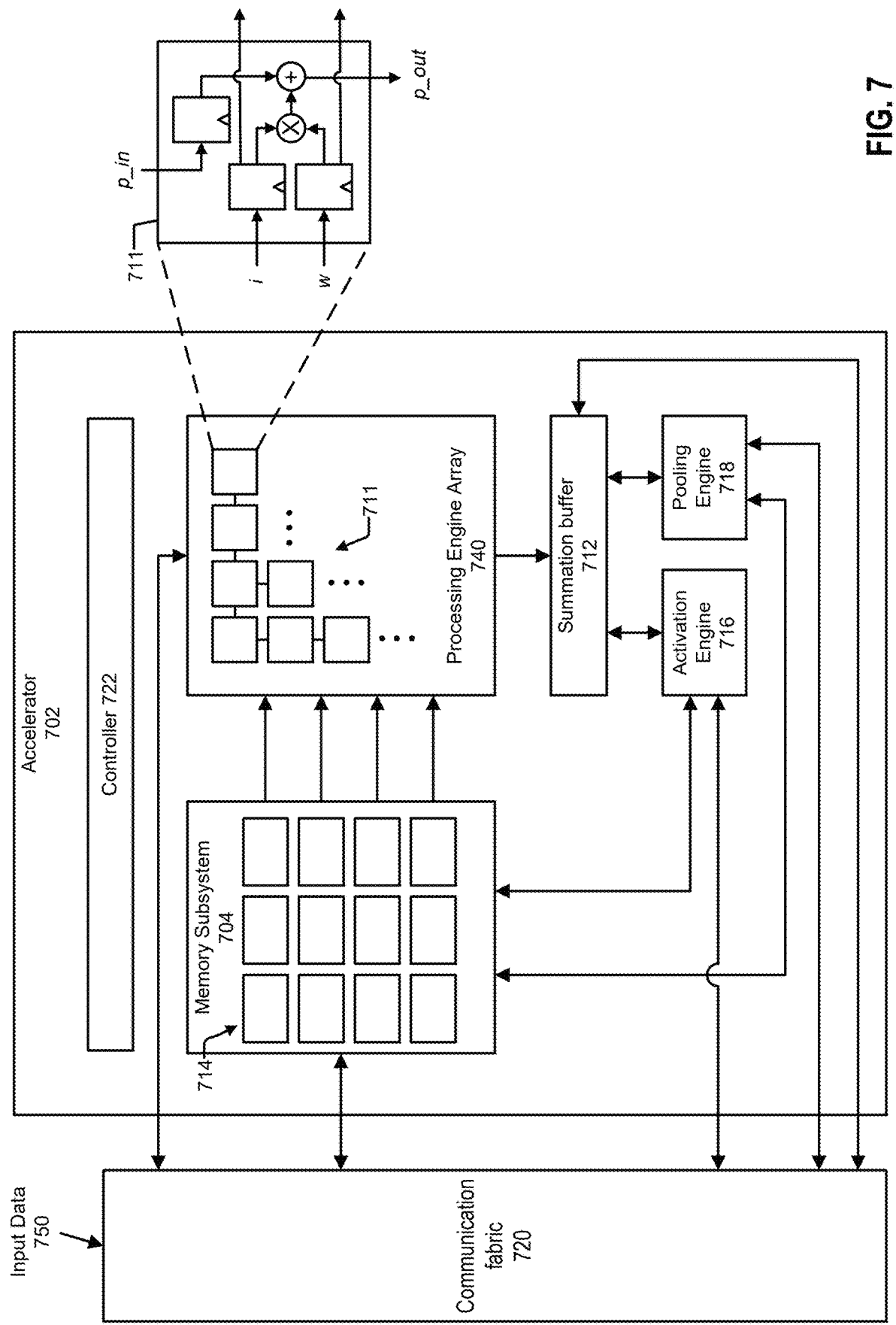
FIG. 7 illustrates an example of an integrated circuit device that can support the example training processes of FIGS. 4A-4C.

FIG. 7 is a block diagram illustrating an example of an integrated circuit device that can be configured to perform various types of neural network operations, such as those described in FIG. 2A-FIG. 4E and can be part of neural network processor 512 of FIG. 5C. The example of FIG. 7 illustrates an accelerator 702. In various examples, the accelerator 702, for a set of input data (e.g., input data 750), can execute computations using a processing engine array 710, an activation engine 716, and/or a pooling engine 718. The processor may have other integrated circuit components, including additional accelerator engines. Accelerator 702 may include a controller 722 to control the operations of processing engine array 710, activation engine 716, and/or pooling engine 718.

In various implementations, the memory subsystem 704 can include multiple memory banks 714. In these implementations, each memory bank 714 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 714. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 704 can permit simultaneous access to the read or write channels of multiple memory banks. As another example, the memory subsystem 704 can include arbitration logic such that arbitration between, for example, the outputs of multiple memory banks 714 can result in more than one memory bank's output being used. In these and other examples, though globally managed by the memory subsystem 704, each memory bank can be operated independently of any other.

Having the memory banks 714 be independently accessible can increase the efficiency of the accelerator 702. For example, values can be simultaneously read and provided to each row of the processing engine array 710, so that the entire processing engine array 710 can be in use in one clock cycle. As another example, the memory banks 714 can be read at the same time that results computed by the processing engine array 710 are written to the memory subsystem 704. In contrast, a single memory may be able to service only one read or write at a time. With a single memory, multiple clock cycles can be required, for example, to read input data for each row of the processing engine array 710 before the processing engine array 710 can be started.

In various implementations, the memory subsystem 704 can be configured to simultaneously service multiple clients, including the processing engine array 710, the activation engine 716, the pooling engine 718, and any external clients that access the memory subsystem 704 over a communication fabric 720. In some implementations, being able to service multiple clients can mean that the memory subsystem 704 has at least as many memory banks as there are clients. In some cases, each row of the processing engine array 710 can count as a separate client. In some cases, each column of the processing engine array 710 can output a result, such that each column can count as a separate write client. In some cases, output from the processing engine array 710 can be written into the memory banks 714 that can then subsequently provide input data for the processing engine array 710. As another example, the activation engine 716 and the pooling engine 718 can include multiple execution channels, each of which can be separate memory clients. The memory banks 714 can be implemented, for example, using static random access memory (SRAM).

In various implementations, the memory subsystem 704 can include control logic. The control logic can, for example, keep track of the address spaces of each of the memory banks 714, identify memory banks 714 to read from or write to, and/or move data between the memory banks 714. In some implementations, memory banks 714 can be hardwired to particular clients. For example, a set of memory banks 714 can be hardwired to provide values to the rows of the processing engine array 710, with one memory bank servicing each row. As another example, a set of memory banks can be hard wired to receive values from columns of the processing engine array 710, with one memory bank receiving data for each column.

The processing engine array 710 is the computation matrix of the example accelerator 702. The processing engine array 710 can, for example, execute parallel integration, convolution, correlation, and/or matrix multiplication, among other things. The processing engine array 710 includes multiple processing engines 711, arranged in rows and columns, such that results output by one processing engine 711 can be input directly into another processing engine 711. Processing engines 711 that are not on the outside edges of the processing engine array 710 thus can receive data to operate on from other processing engines 711, rather than from the memory subsystem 704.

In various examples, the processing engine array 710 uses systolic execution, in which data arrives at each processing engine 711 from different directions at regular intervals. In some examples, input data can flow into the processing engine array 710 from the left and weight values can be loaded at the top. In some examples weights and input data can flow from the left and partial sums can flow from top to bottom. In these and other examples, a multiply-and-accumulate operation moves through the processing engine array 710 as a diagonal wave front, with data moving to the right and down across the array. Control signals can be input at the left at the same time as weights, and can flow across and down along with the computation.

In various implementations, the number of columns in the processing engine array 710 determines the computational capacity of the processing engine array 710, and the number of rows determines the required memory bandwidth for achieving maximum utilization of the processing engine array 710. The processing engine array 710 can have, for example, 64 columns and 64 rows, or some other number of columns and rows.

An example of a processing engine 711 is illustrated in FIG. 7 in an inset diagram. As illustrated by this example, a processing engine 711 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 711.

In the illustrated example, an input from above can include a partial sum, p_in, provided either from another processing engine 711 or from a previous round of computation by the processing engine array 710. When starting a computation for a new set of input data, the top row of the processing engine array 710 can receive a fixed value for p_in, such as zero. As illustrated by this example, i and w are multiplied together and the result is summed with p_in to produce a new partial sum, p_out, which can be input into another processing engine 711. Various other implementations of the processing engine 411 are possible.

Outputs from the last row in the processing engine array 710 can be temporarily stored in summation buffer 712. The results can be intermediate results, which can be written to the memory banks 714 to be provided to the processing engine array 710 for additional computation. Alternatively, the results can be final results, which, once written to the memory banks 714 can be read from the memory subsystem 704 over the communication fabric 720, to be output by the system.

In some implementations, the accelerator 702 includes an activation engine 716. In these implementations, the activation engine 716 can combine the results from the processing engine array 710 into one or more output activations. For example, for a convolutional neural network, convolutions from multiple channels can be summed to produce an output activation for a single channel. In other examples, accumulating results from one or more columns in the processing engine array 710 may be needed to produce an output activation for a single node in the neural network. In some examples, activation engine 716 can be bypassed.

In various examples, the activation engine 716 can include multiple separate execution channels. In these examples, the execution channels can correspond to the columns of the processing engine array 710, and can perform an operation on the outputs of a column, the result of which can be stored in the memory subsystem 704. In these examples, the activation engine 716 may be able to perform between 1 and n parallel computations, where n is equal to the number of columns in the processing engine array 710. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 702 can include a pooling engine 718. Pooling is the combining of outputs of the columns of the processing engine array 710. Combining can include for example, computing a maximum value, a minimum value, an average value, a median value, a summation, a multiplication, or another logical or mathematical combination. In various examples, the pooling engine 718 can include multiple execution channels that can operating on values from corresponding columns of the processing engine array 710. In these examples, the pooling engine 718 may be able to perform between 1 and n parallel computations, where n is equal to the number of columns in the processing engine array 710. In various examples, execution channels of the pooling engine 718 can operate in parallel and/or simultaneously. In some examples, the pooling engine 718 can be bypassed.

Herein, the activation engine 716 and the pooling engine 718 may be referred to collectively as execution engines. The processing engine array 710 is another example of an execution engine. Another example of an execution engine is a Direct Memory Access (DMA) engine, which may be located outside the accelerator 702.

Input data 750 can arrive over the communication fabric 720. The communication fabric 720 can connect the accelerator 702 to other components of a processor, such as a DMA engine that can obtain input data 750 from an Input/Output (I/O) device, a storage drive, or a network interface. The input data 750 can be, for example one-dimensional data, such as a character string or numerical sequence, or two-dimensional data, such as an array of pixel values for an image or frequency and amplitude values over time for an audio signal. In some examples, the input data 750 can be three-dimensional, as may be the case with, for example, the situational information used by a self-driving car or virtual reality data. In some implementations, the memory subsystem 704 can include a separate buffer for the input data 750. In some implementations, the input data 750 can be stored in the memory banks 714 when the accelerator 702 receives the input data 750.

In some examples, the accelerator 702 can implement a neural network processing engine. Accelerator 702 can execute a neural network to perform a task for which the neural network was trained for a set of input data 750, such as performing an inference task. Accelerator 702 can also execute various operations of a training process, such as forward propagation operations, backward propagation operations, weight updating operations, etc., to update the weights for the neural network. For example, processing engine array 710 can be controlled to perform forward propagation computations according to Equation 1 to support an inference task, and forward propagation computations and backward propagation computations based on Equation 1 to support a training process.

The weights for the neural network can be stored in the memory subsystem 704, along with input data 750 on which the neural network will operate. The addresses of the weights and input data 750 in memory subsystem 704 can be based on or mapped to the coordinates of the weights and input data 750 in, respectively, a weight data array and an input data array, which allows the weight and the input data to be retrieved based on addresses derived from their coordinates. The neural network can also include instructions, which can be executed by controller 722 to control the processing engine array 710 to perform various computations on the weights and the input data to support an inference task or a training process. The instructions can be generated by a compiler and can also be stored in the memory subsystem 704, in the memory banks 714 or in a separate instruction buffer. The processing engine array 710 can output intermediate results, which represent the outputs of individual layers of the neural network. In some cases, the activation engine 716 and/or pooling engine 718 may be enabled for computations called for by certain layers of the neural network. The accelerator 702 can store the intermediate results in the memory subsystem 704 for inputting into the processing engine array 710 to compute results for the next layer of the neural network. The processing engine array 710 can further output final results from a last layer of the neural network. The final results can be stored in the memory subsystem 704 and then be copied out to host processor memory or to another location.

Figure 8:
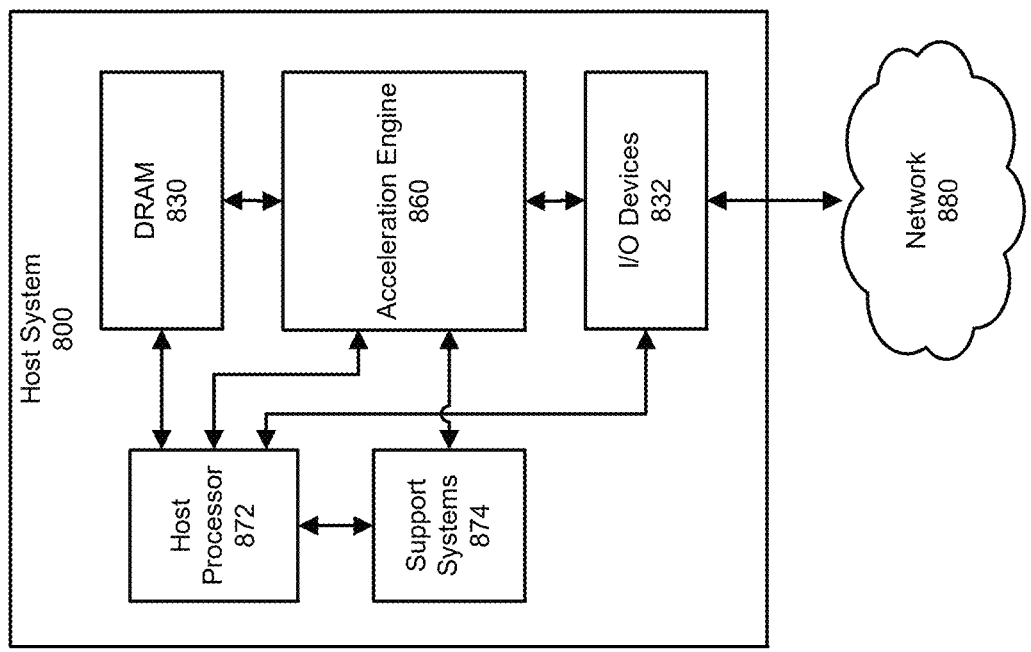
FIG. 8 illustrates an example of a host system that can support the example training processes of FIGS. 4A-4C.

FIG. 8 includes a block diagram that illustrates an example of a host system 800 in which an acceleration engine 860 can be used. The acceleration engine 860 of FIG. 8 is an example of a device that can include one or more accelerators such as is illustrated in FIG. 7. Host system 800 can be configured as a worker node and can be computing system 504 of FIG. 5B. The example host system 800 of FIG. 8 includes the acceleration engine 860, a host processor 872, DRAM 830 or processor memory, I/O devices 832, and support systems 874. In various implementations, the host system 800 can include other hardware that is not illustrated here.

The host processor 872 is a general purpose integrated circuit that is capable of executing program instructions. In some examples, the host processor 872 can include multiple processing cores. A multi-core processor may include multiple processing units within the same processor. In some examples, the host system 800 can include more than one host processor 872. In some examples, the host processor 872 and the acceleration engine 860 can be one chip, such as, one or more integrated circuits within the same package.

In various examples, the host processor 872 can communicate with other components in the host system 800 over one or more communication channels. For example, the host system 800 can include a host processor bus, which the host processor 872 can use to communicate with the DRAM 830, for example. As another example, the host system 800 can include an I/O bus, such as a PCI-based bus, over which the host processor 872 can communicate with the acceleration engine 860 and/or the I/O devices 832, for example. In various examples, the host system 800 can, alternatively or additionally, include other communication channels or busses, such as serial busses, power management busses, storage device busses, and so on.

In some examples, software programs executing on the host processor 872 can receive or generate input for processing by the acceleration engine 860. In some examples, the programs can select an appropriate neural network to execute for a given input. For example, a program may be for language translation, and can select one or more neural networks capable of speech recognition and/or machine translation. In these and other examples, the programs can configure the acceleration engine 860 with the neural network to execute, and/or can select a neural network processing engine on the acceleration engine 860 that has previously been configured to execute the desired neural network. In some examples, once the acceleration engine 860 has started an inference on input data, the host processor 872 can manage the movement of data (such as weights, instructions, intermediate results, results of conditional layers, and/or final results) into or out of the acceleration engine 860.

In some examples, a software program that is using the acceleration engine 860 to conduct an inference can read the result from a conditional layer from the acceleration engine 860 and/or from a storage location, such as in DRAM 830. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 830 is memory that is used by the host processor 872 for storage of program code that the host processor 872 is in the process of executing, as well as values that are being operated on. In some examples, the data for a neural network (e.g., weight values, instructions, and other data) can be all or partially stored in the DRAM 830. DRAM is a common term for processor memory, and though DRAM is volatile memory, processor memory can be volatile and/or non-volatile. Though not illustrated here, the host system 800 can include other volatile and non-volatile memories for other purposes. For example, the host system 800 can include a Read-Only Memory (ROM) that stores boot code for booting the host system 800 at power on, and/or Basic Input/Output System (BIOS) code.

Though not illustrated here, the DRAM 830 can store instructions for various programs, which can be loaded into and be executed by the host processor 872. For example, the DRAM 830 can be storing instructions for an operating system, one or more data stores, one or more application programs, one or more drivers, and/or services for implementing the features disclosed herein.

The operating system can manage and orchestrate the overall operation of the host system 800, such as scheduling tasks, executing applications, and/or controller peripheral devices, among other operations. In some examples, a host system 800 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 800. For example, some drivers can provide communication between the operating system and peripheral devices or I/O devices 832. Alternatively or additionally, some drivers may provide communication between application programs and the operating system, and/or application programs and peripheral devices accessible to the host system 800. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 832 can include hardware for connecting to user input and output devices, such as keyboards, mice, pens, tablets, voice input devices, touch input devices, displays or monitors, speakers, and printers, among other devices. The I/O devices 832 can also include storage drives and/or network interfaces for connecting to a network 880. For example, the host system 800 can use a network interface to communicate with storage devices, user terminals, other computing devices or servers, and/or other networks, among various examples.

In various examples, one or more of the I/O devices 832 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 800 or may be in an external enclosure. A storage device can be fixed (e.g., attached by screws) or removable (e.g., having a physical release mechanism and possibly a hot-plug mechanism).

Storage devices, the DRAM 830, and any other memory component in the host system 800 are examples of computer-readable storage media. Computer-readable storage media are physical mediums that are capable of storing data in a format that can be read by a device such as the host processor 872. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

Figure 9:
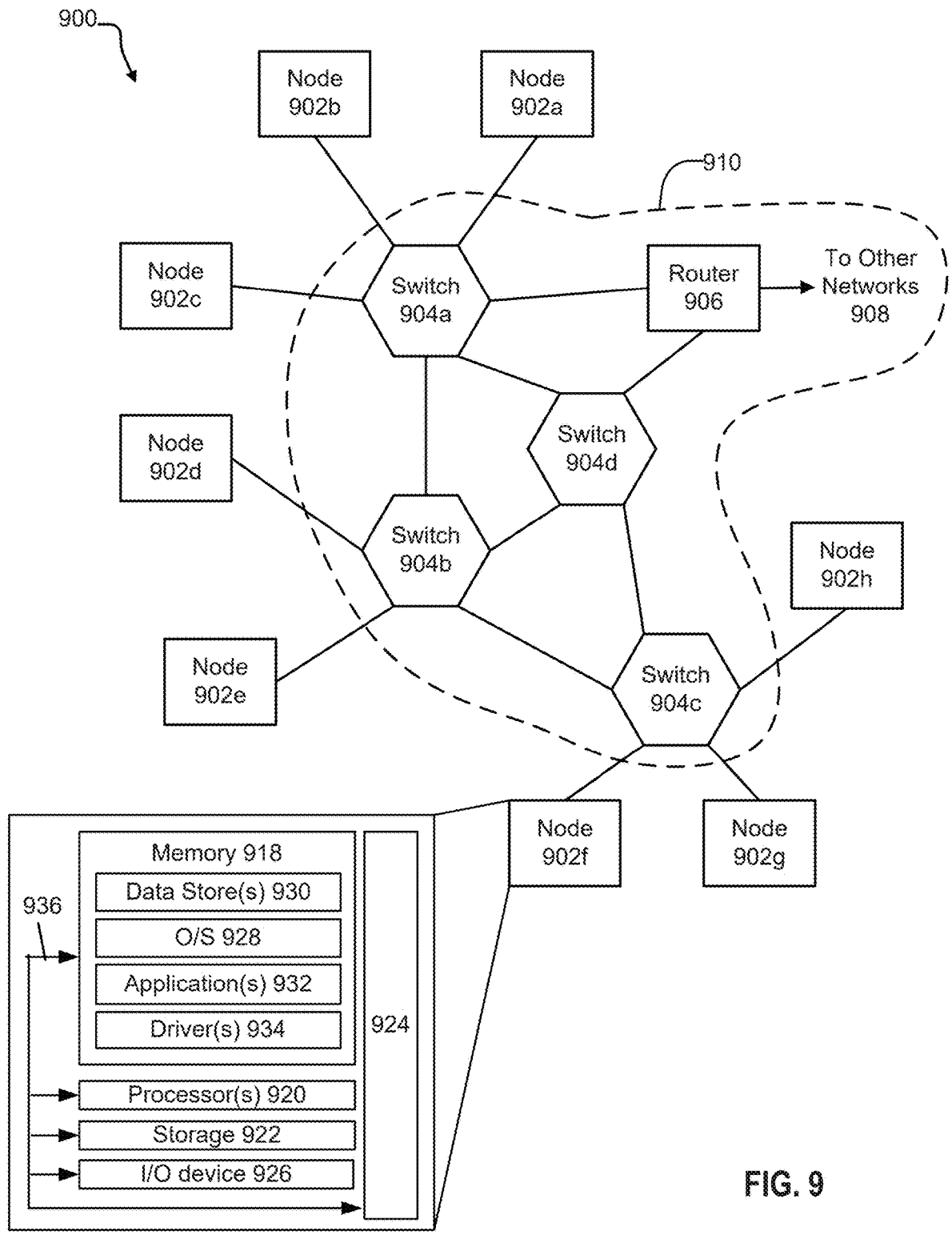
FIG. 9 includes a diagram of an example network.

FIG. 9 includes a diagram of an example network 900, which can include one or more host systems, such as the host system illustrated in FIG. 8. For example, the example network 900 of FIG. 9 includes multiple nodes 902a-902h, one or more of which can be a host system such as is illustrated in FIG. 8. Others of the nodes 902a-902h can be other computing devices, each of which include at least a memory for storing program instructions, a processor for executing the instructions, and a network interface for connecting to the network 900.

In various examples, the network 900 can be used to process data. For example, input data can be received at one of the nodes 902a-902h or from other networks 908 with which the network 900 can communicate. In this example, the input data can be directed to a node in the network 900 that includes an acceleration engine, for the acceleration engine to operate on and produce a result. The result can then be transferred to the node or other network from which the input data was received. In various examples, input data can be accumulated from various sources, including one or more of the nodes 902a-902h and/or computing devices located in the other networks 908, and the accumulated input data can be directed to one or more host systems in the network 900. Results from the host systems can then be distributed back to the sources from which the input data was gathered.

In various examples, one or more of the nodes 902a-902h can be responsible for operations such as accumulating input data for host systems to operate on, keeping track of which host systems are busy and which can accept more work, determining whether the host systems are operating correctly and/or most efficiently, monitoring network security, and/or other management operations.

In the example of FIG. 9, the nodes 902a-902h are connected to one another using a switched architecture with point-to point links. The switched architecture includes multiple switches 904a-904d, which can be arranged in a multi-layered network such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. The switches 904a-904d of FIG. 9 may be connected to the nodes 902a-902h and provide multiple paths between any two nodes.

The network 900 may also include one or more network devices for connection with other networks 908, such as a router 906. Routers use headers and forwarding tables to determine the best path for forwarding the packets, and use protocols such as internet control message protocol (ICMP) to communicate with each other and configure the best route between any two devices. The router 906 of FIG. 9 can be used to connect to other networks 908 such as subnets, LANs, wide area networks (WANs), and/or the Internet.

In some examples, network 900 may include any one or a combination of many different types of networks, such as cable networks, the Internet, wireless networks, cellular networks and other private and/or public networks. The interconnected switches 904a-904d and the router 906, if present, may be referred to as a switch fabric 910, a fabric, a network fabric, or simply a network. In the context of a computer network, terms "fabric" and "network" may be used interchangeably herein.

The nodes 902a-902h may be any combination of host systems, processor nodes, storage subsystems, and I/O chassis that represent user devices, service provider computers or third party computers.

User devices may include computing devices to access an application 932 (e.g., a web browser or mobile device application). In some aspects, the application 932 may be hosted, managed, and/or provided by a computing resources service or service provider. The application 932 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 908. Additionally, the user device(s) may be part of the distributed system managed by, controlled by, or otherwise part of the service provider computer(s) (e.g., a console device integrated with the service provider computers).

The node(s) of FIG. 9 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some examples, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 932 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 902a-902h may include at least one memory 918 and one or more processing units (or processor(s) 920). The processor(s) 920 may be implemented in hardware, computer-executable instructions, firmware, or combinations thereof. Computer-executable instruction or firmware implementations of the processor(s) 920 may include computer-executable or machine-executable instructions written in any suitable programming language to perform the various functions described.

In some instances, the hardware processor(s) 920 may be a single core processor or a multi-core processor. A multi-core processor may include multiple processing units within the same processor. In some examples, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 918 may store program instructions that are loadable and executable on the processor(s) 920, as well as data generated during the execution of these programs. Depending on the configuration and type of the node(s) 902a-902h, the memory 918 may be volatile (such as RAM) and/or non-volatile (such as ROM, flash memory, etc.). The memory 918 may include an operating system 928, one or more data stores 930, one or more application programs 932, one or more drivers 934, and/or services for implementing the features disclosed herein.

The operating system 928 may support nodes 902a-902h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, IOS, Android, and the like. The operating system 928 may also be a proprietary operating system.

The data stores 930 may include permanent or transitory data used and/or operated on by the operating system 928, application programs 932, or drivers 934. Examples of such data include web pages, video data, audio data, images, user data, and so on. The information in the data stores 930 may, in some implementations, be provided over the network(s) 908 to user devices. In some cases, the data stores 930 may additionally or alternatively include stored application programs and/or drivers. Alternatively or additionally, the data stores 930 may store standard and/or proprietary software libraries, and/or standard and/or proprietary application user interface (API) libraries. Information stored in the data stores 930 may be machine-readable object code, source code, interpreted code, or intermediate code.

The drivers 934 include programs that may provide communication between components in a node. For example, some drivers 934 may provide communication between the operating system 928 and additional storage 922, network device 924, and/or I/O device 926. Alternatively or additionally, some drivers 934 may provide communication between application programs 932 and the operating system 928, and/or application programs 932 and peripheral devices accessible to the service provider computer. In many cases, the drivers 934 may include drivers that provide well-understood functionality (e.g., printer drivers, display drivers, hard disk drivers, Solid State Device drivers). In other cases, the drivers 934 may provide proprietary or specialized functionality.

The service provider computer(s) or servers may also include additional storage 922, which may include removable storage and/or non-removable storage. The additional storage 922 may include magnetic storage, optical disks, solid state disks, flash memory, and/or tape storage. The additional storage 922 may be housed in the same chassis as the node(s) 902a-902h or may be in an external enclosure. The memory 918 and/or additional storage 922 and their associated computer-readable media may provide non-volatile storage of computer-readable instructions, data structures, program modules, and other data for the computing devices. In some implementations, the memory 918 may include multiple different types of memory, such as SRAM, DRAM, or ROM.

The memory 918 and the additional storage 922, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 918 and the additional storage 922 are examples of computer storage media. Additional types of computer storage media that may be present in the node(s) 902a-902h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 902a-902h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 902a-902h may also include I/O device(s) 926, such as a keyboard, a mouse, a pen, a voice input device, a touch input device, a display, speakers, a printer, and the like. The node(s) 902a-902h may also include one or more communication channels 936. A communication channel 936 may provide a medium over which the various components of the node(s) 902a-902h can communicate. The communication channel or channels 936 may take the form of a bus, a ring, a switching fabric, or a network.

The node(s) 902a-902h may also contain network device(s) 924 that allow the node(s) 902a-902h to communicate with a stored database, another computing device or server, user terminals and/or other devices on the network(s) 900.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A non-transitory computer readable medium storing instructions that, when executed by one or more hardware processors of a worker node, cause the one or more hardware processors to:
    perform, by the worker node, backward propagation computations for a second layer of a neural network to generate second weight gradients;
    split, by the worker node, the second weight gradients into a plurality of subsets, each subset of the second weight gradients being associated with a second exchange operation with other worker nodes over a computer network, a number of the second weight gradients included in each subset being based on (i) a topology of the neural network including a size of the second layer and (ii) an overhead time of each of the second exchange operations in the computer network;
    begin performing second exchange operations with the other worker nodes over the computer network to exchange the plurality of subsets of the second weight gradients;
    perform, by the worker node, backward propagation computations for a first layer of the neural network to generate first weight gradients, the backward propagation computations for the first layer being performed in parallel with at least one of the second exchange operations;
    after the backward propagation computations for the first layer have been performed by the worker node:
        suspend performing the second exchange operations after the at least one of the second exchange operations completes; and
        perform first exchange operations with the other worker nodes over the computer network to exchange the first weight gradients; and
    after the first exchange operations are completed, resume performing the second exchange operations by performing remaining second exchange operations over the computer network to exchange remaining subsets of the second weight gradients generated by the backward propagation computations for the second layer.

2. The non-transitory computer readable medium of claim 1, wherein the number of the second weight gradients included in each subset is further based on at least one of: a topology of the computer network or a threshold network efficiency in transmitting the first and second weight gradients.

3. The non-transitory computer readable medium of claim 1, wherein the number of the second weight gradients included in each subset is further based on a number of the second weight gradients to be exchanged.

4. The non-transitory computer readable medium of claim 1, wherein the number of the second weight gradients included in each subset is based on a profile configuration to minimize a time of completion of a training process; and
    wherein the profile configuration is selected from a plurality of profile configurations.

5. The non-transitory computer readable medium of claim 4, wherein the number is a first number; and
    wherein the profile configuration indicates a second number of third weight gradients to be included in a third exchange operation for a third layer of the neural network.

6. The non-transitory computer readable medium of claim 5, wherein the first number and the second number are different.

7. The non-transitory computer readable medium of claim 4, wherein the profile configuration indicates that a subset of the second weight gradients and a subset of third weight gradients of a third layer of the neural network are to be exchanged in a second exchange operation.

8. The non-transitory computer readable medium of claim 1, further storing instructions that, when executed by the one or more hardware processors, cause the one or more hardware processors to:
    generate a plurality of second exchange tasks, each second exchange task being associated with a subset of the second weight gradients;
    store the plurality of second exchange tasks in a buffer;
    retrieve a second exchange task from the buffer;

execute the second exchange task to perform a second exchange operation;
generate a first exchange task associated with the first weight gradients;
store the first exchange task; and
responsive to storing the first exchange task and to the second exchange operation being completed, retrieve the first exchange task and execute the first exchange task to perform the first exchange operations.

9. The non-transitory computer readable medium of claim 8, further storing instructions that, when executed by the one or more hardware processors, cause the one or more hardware processors to, when executing each of the plurality of second exchange tasks:
establish a communication channel with each of the other worker nodes; and
exchange a subset of the second weight gradients with each of the other worker nodes via the respective communication channel.

10. The non-transitory computer readable medium of claim 8, wherein the retrieval of the first exchange task responsive to storing the first exchange task and to the second exchange operation being completed is based on a policy of prioritizing execution of exchange tasks of lower layers of the neural network over execution of exchange tasks of higher layers of the neural network.

11. An apparatus comprising:
a neural network processor;
a hardware interface; and
an integrated circuit comprising an exchange processor;
wherein the apparatus is configured to:
control the neural network processor to perform backward propagation computations for a second layer of a neural network to generate second weight gradients;
control the integrated circuit to split the second weight gradients into a plurality of subsets, each subset of the second weight gradients being associated with a second exchange operation with other computing systems over a computer network, a number of the second weight gradients included in each subset being based on (i) a topology of the neural network including a size of the second layer and (ii) an overhead time of each of the second exchange operations in the computer network;
control the exchange processor to begin performing second exchange operations with the other computing systems over the computer network to exchange the plurality of subsets of the second weight gradients;
control the neural network processor to perform backward propagation computations for a first layer of the neural network to generate first weight gradients, the backward propagation computations for the first layer being performed in parallel with at least one of the second exchange operations by the exchange processor;
after the backward propagation computations for the first layer have been performed by the neural network processor:
control the exchange processor to suspend performing the second exchange operations after the at least one of the second exchange operations completes; and
control the exchange processor to perform first exchange operations with the other computing systems over the computer network to exchange the first weight gradients after the at least one of the second exchange operations completes; and
after the first exchange operations are completed, control the exchange processor to resume performing the second exchange operations by performing remaining second exchange operations over the computer network to exchange remaining subsets of the second weight gradients generated by the backward propagation computations for the second layer.

12. The apparatus of claim 11, wherein the number of the second weight gradients included in each subset is based on a profile configuration to minimize a time of completion of a training process; and
wherein the profile configuration is selected from a plurality of profile configurations.

13. The apparatus of claim 11, wherein the number of the second weight gradients included in each subset is further based on at least one of: a topology of the computer network or a threshold network efficiency in transmitting the first and second weight gradients.

14. The apparatus of claim 11, wherein the number of the second weight gradients included in each subset is further based on a number of the second weight gradients to be exchanged.

15. A method implemented by a worker node, the method comprising:
performing backward propagation computations for a second layer of a neural network to generate second weight gradients;
splitting the second weight gradients into a plurality of subsets, each subset of the second weight gradients being associated with a second exchange operation with other worker nodes over a computer network, a number of the second weight gradients included in each subset being based on (i) a topology of the neural network including a size of the second layer and (ii) an overhead time of each of the second exchange operations in the computer network;
beginning performing second exchange operations with the other worker nodes over the computer network to exchange the plurality of subsets of the second weight gradients;
performing backward propagation computations for a first layer of the neural network to generate first weight gradients, the backward propagation computations for the first layer being performed in parallel with at least one of the second exchange operations;
after the backward propagation computations for the first layer have been performed by the worker node:
suspending performing the second exchange operations after the at least one of the second exchange operations completes; and
performing first exchange operations with the other worker nodes over the computer network to exchange the first weight gradients; and
after the first exchange operations are completed, resuming performing the second exchange operations by performing remaining second exchange operations over the computer network to exchange remaining subsets of the second weight gradients generated by the backward propagation computations for the second layer.

16. The method of claim 15, wherein the number of the second weight gradients included in each subset is further based on at least one of: a topology of the computer network or a threshold network efficiency in transmitting the first and second weight gradients.

17. The method of claim 15, wherein the number of the second weight gradients included in each subset is further based on a number of the second weight gradients to be exchanged.

18. The method of claim 15, wherein the number of the second weight gradients included in each subset is based on a profile configuration to minimize a time of completion of a training process; and
   wherein the profile configuration is selected from a plurality of profile configurations.

* * * * *